US008615162B2

(12) United States Patent
Tanikawa

(10) Patent No.: US 8,615,162 B2
(45) Date of Patent: Dec. 24, 2013

(54) CONTENT REPRODUCTION DEVICE

(75) Inventor: Kentaro Tanikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 947 days.

(21) Appl. No.: 12/663,742

(22) PCT Filed: Apr. 24, 2009

(86) PCT No.: PCT/JP2009/001890
§ 371 (c)(1),
(2), (4) Date: Jan. 4, 2010

(87) PCT Pub. No.: WO2009/136481
PCT Pub. Date: Nov. 12, 2009

(65) Prior Publication Data
US 2010/0192233 A1   Jul. 29, 2010

(30) Foreign Application Priority Data
May 9, 2008   (JP) ................................ 2008-123555

(51) Int. Cl.
H04N 5/92   (2006.01)
H04N 5/93   (2006.01)

(52) U.S. Cl.
USPC .......................................... 386/261; 386/252

(58) Field of Classification Search
USPC .................. 386/261, 248, 252, 255, 257, 262
See application file for complete search history.

(56) References Cited

U.S. PATENT DOCUMENTS

| 5,969,748 A | 10/1999 | Casement et al. |
| 6,144,401 A | 11/2000 | Casement et al. |
| 2003/0147630 A1 | 8/2003 | Kawai et al. |
| 2005/0125822 A1 | 6/2005 | Casement et al. |
| 2005/0149977 A1 | 7/2005 | Nakamura et al. |
| 2005/0238325 A1* | 10/2005 | Tanabe et al. ................ 386/95 |
| 2006/0064757 A1* | 3/2006 | Poslinski ..................... 726/26 |

(Continued)

FOREIGN PATENT DOCUMENTS

| CN | 1283043 | 2/2001 |
| JP | 2000-311417 | 11/2000 |

(Continued)

OTHER PUBLICATIONS

Chinese Office Action issued Feb. 24, 2012 in Chinese Patent Application No. 200980116441.5.

(Continued)

*Primary Examiner* — Robert Chevalier
(74) *Attorney, Agent, or Firm* — Wenderoth, Lind & Ponack, L.L.P.

(57) ABSTRACT

Provided is a content playback apparatus that generates a GUI corresponding to various pieces of restriction information to restrict playback of a content when displaying the GUI for causing a user to select a content to be played back, and that can respond to a new piece of restriction information. The content playback apparatus generates content lists for the various pieces of restriction, and generates a GUI which can display each content list for each piece of restriction information by switching. When a content to which the new piece of restriction information has been attached is added, setting information for the new piece of restriction information is obtained from a content distribution server and the like by referring to an ID attached to the content, or an ID of the restriction information having been attached to the content, and a content list for the newly obtained restriction information is generated and displayed.

11 Claims, 38 Drawing Sheets

(56) References Cited

U.S. PATENT DOCUMENTS

| | | |
|---|---|---|
| 2006/0136961 A1 | 6/2006 | Adachi |
| 2008/0077998 A1 | 3/2008 | Hirosawa et al. |
| 2008/0178210 A1 | 7/2008 | Casement et al. |
| 2008/0247731 A1 | 10/2008 | Yamauchi et al. |
| 2008/0295183 A1 | 11/2008 | Okamoto et al. |
| 2012/0039583 A1 | 2/2012 | Casement et al. |

FOREIGN PATENT DOCUMENTS

| | | |
|---|---|---|
| JP | 2001-157188 | 6/2001 |
| JP | 2001-251582 | 9/2001 |
| JP | 2003-230080 | 8/2003 |
| JP | 2004-208198 | 7/2004 |
| JP | 2005-198039 | 7/2005 |
| JP | 2005-267330 | 9/2005 |
| JP | 2005-340972 | 12/2005 |
| JP | 2006-40332 | 2/2006 |
| JP | 2006-59326 | 3/2006 |
| JP | 2006-166263 | 6/2006 |
| JP | 2006-180121 | 7/2006 |
| JP | 2006-195840 | 7/2006 |
| JP | 2007-88896 | 4/2007 |
| JP | 2007-533047 | 11/2007 |
| JP | 2008-71472 | 3/2008 |

OTHER PUBLICATIONS

International Search Report issued Jun. 30, 2009 in International (PCT) Application No. PCT/JP2009/001890.

* cited by examiner

FIG. 3

| Restriction information type ID 301 | Viewing restriction type 302 | Viewing restriction removal timing 303 | Viewing restriction removal range 304 | Viewing restriction removal period 305 | Display method before removing viewing restriction 306 | Display method after removing viewing restriction 307 | Viewing restriction removal state 308 |
|---|---|---|---|---|---|---|---|
| 1 | No restriction | — | — | — | — | — | — |
| 2 | R-15 | At the time of first display | All contents of the same type | Power OFF | ·Program name display<br>·Tab display | ·Included in no restriction display<br>·Tab display | Removed |
| 3 | R-20 | At the time of menu item selection | Only the content | GUI non display | ·Program name non display<br>·Tab non display | ·Not included in no restriction display<br>·Tab addition | Not removed |
| ... | ... | ... | ... | ... | ... | ... | ... |

| Content management ID /401 | Content title /402 | Restriction information type ID /403 | Recording date and time /404 | Distribution source /405 | Viewing information /406 | ... |
|---|---|---|---|---|---|---|
| ... | ... | ... | ... | ... | ... | ... |
| 0168 | News X | 1 | 2008/02/14 18:00-18:30 | Terrestrial D010 | Viewed | ... |
| 0169 | Flamy smile | 3 | 2008/02/16 20:00 | Company A | Viewed | ... |
| 0170 | Disparate martial art F1 | 2 | 2008/02/19 09:29 | Company C | Not viewed | ... |
| 0171 | Friday Japanese movie theater "Shizuka Gozen" | 1 | 2008/02/20 21:02-23:24 | Terrestrial D080 | Viewed | ... |
| ... | ... | ... | ... | ... | ... | ... |

| 1301 Restriction information type ID | 1302 Viewing restriction type | 1303 Viewing restriction removal timing | 1304 Viewing restriction removal range | 1305 Viewing restriction removal period | 1306 Display method before removing viewing restriction | 1307 Display method after removing viewing restriction | 1308 Viewing restriction removal state |
|---|---|---|---|---|---|---|---|
| 6 | Restriction on number of times | At the time of first display | Only the content | GUI non display | Program name non display | Not included in no restriction | Not removed |

| Restriction information type ID /301 | Viewing restriction type /302 | Viewing restriction removal timing /303 | Viewing restriction removal range /304 | Viewing restriction removal period /305 | Display method before removing viewing restriction /306 | Display method after removing viewing restriction /307 | Viewing restriction removal state /308 |
|---|---|---|---|---|---|---|---|
| 1 | No restriction | — | — | — | — | — | — |
| 2 | R-15 | At the time of first display | All contents of the same type | Power OFF | Program name display | Included in no restriction display | Removed |
| 3 | R-20 | At the time of sub menu item selection | Only the content | GUI non display | Program name non display | Not included in no restriction display | Not removed |
| ... | ... | ... | ... | ... | ... | ... | ... |
| 6 | Restriction on number of times | At the time of first display | Only the content | GUI non display | Program name non display | Not included in no restriction display | Not removed |

| Restriction information type ID 2101 | Viewing restriction type 2102 | Viewing restriction removal timing 2103 | Viewing restriction removal range 2104 | Viewing restriction removal period 2105 | Display method before removing viewing restriction 2106 | Display method after removing viewing restriction 2107 | Viewing restriction removal state 2108 | Viewing restriction level 2109 |
|---|---|---|---|---|---|---|---|---|
| 1 | All programs | — | — | — | — | — | — | 0 |
| 2 | R-15 | At the time of first display | All contents of the same type | Power OFF | ·Program name display<br>·Not included in all programs<br>·Tab display | ·Included in all programs<br>·Tab display | Removed | 5 |
| 3 | R-20 | At the time of menu item selection | All contents of the same type | Power OFF | ·Program name non display<br>·Not included in all programs<br>·Tab non display | ·Included in all programs<br>·Tab addition | Not removed | 10 |
| ... | ... | ... | ... | ... | ... | ... | ... | ... |

| Restriction information type ID 2801 | Viewing restriction type 2802 | Viewing restriction removal timing 2803 | Viewing restriction removal range 2804 | Viewing restriction removal period 2805 | Display method before removing viewing restriction 2806 | Display method after removing viewing restriction 2807 | Viewing restriction removal state 2808 |
|---|---|---|---|---|---|---|---|
| 1 | All programs | — | — | — | — | — | — |
| 2 | R-15 | At the time of first display | All contents of the same type | Power OFF | ·Program name display<br>·Tab display | ·Included in all programs<br>·Tab display | Removed |
| 3 | R-20 | At the time of sub menu item selection | Only the content | GUI non display | ·Program name non display<br>·Tab non display | ·Not included in all programs<br>·Tab addition | Not removed |
| ... | ... | ... | ... | ... | ... | ... | ... |

| Restriction information type ID 2901 | Viewing restriction type 2902 | Viewing restriction removal timing 2903 | Viewing restriction removal range 2904 | Viewing restriction removal period 2905 | Display method before removing viewing restriction 2906 | Display method after removing viewing restriction 2907 | Viewing restriction removal state 2908 |
|---|---|---|---|---|---|---|---|
| 1 | All programs | — | — | — | — | — | — |
| 2 | Ages 15 and older | At the time of first display | All contents of the same type | GUI non display | ·Program name display<br>·Tab display | ·Not included in all programs<br>·Tab display | Removed |
| 3 | Ages 18 and older | At the time of sub menu item selection | Only the content | GUI non display | ·Program name non display<br>·Tab non display | ·Not included in all programs<br>·Tab addition | Not removed |
| ... | ... | ... | ... | ... | ... | ... | ... |

CONTENT REPRODUCTION DEVICE

TECHNICAL FIELD

The present invention relates to a playback apparatus for playing back a content, and especially to display of a list of titles for identifying each content.

BACKGROUND ART

A playback apparatus for playing back a content having been stored in an internal HDD (Hard Disc Drive) embedded in a BD (Blu-ray Disc) recorder, a DVD (Digital Versatile Disc) recorder and so on has a function to display a list of titles of stored contents on a display screen like a television and display, to a user, what kinds of contents it stores.

The user selects a content that he/she desires to view from the displayed list of titles, and a playback apparatus plays back the selected content. At this time, a restriction on playback like a parental lock is sometimes put on the content. Accordingly, there are contents which can be played back only after a password input by the user is authenticated.

Patent Literature 1 discloses a playback unlock apparatus that can remove a viewing restriction by a user inputting a password into a BD recorder using a remote control provided with a digital television and the like, and play back a content.

CITATION LIST

Patent Literature

Patent Literature 1: Japanese Patent Application Publication No. 2006-40332

SUMMARY OF INVENTION

Technical Problem

With the conventional technology, even if a list of content titles is displayed, a user cannot recognize on which content a viewing restriction is put until the user selects playback of the content and a GUI (Graphical User Interface) requesting a password is displayed. Even though the user selects a title to view a content, the content cannot be played back unless the user inputs a password. This may disappoint the user when the user does not know the password. Also in the conventional technology, when there are different viewing restriction severity levels (R-15, R-20 and so on), a same viewing restriction removal method is used, and there is no mechanism by which a removal method, displaying method and the like are flexibly changed depending on a level of a restriction. As a result, there is no choice but to take a viewing restriction removal method at the severest level in viewing any types of contents. It takes a user more operational effort, and this has been a burden to the user.

The present invention was conceived in view of the above problem, and aims to provide a content playback apparatus which can cause a user to, easily recognize what type of viewing restriction is put on a content.

Solution to Problem

In order to achieve the above mentioned object, the present invention provides a content playback apparatus that plays back a content to which restriction information for restricting playback has been attached, by removing the restriction through predetermined processing, the content playback apparatus comprising: a content storage unit for storing a plurality of contents; a setting information storage unit storing setting information, for each of one or more types of restriction information, including one or more rules about how to display an identifier of a content to which the restriction information has been attached; and a display unit operable to generate and display a content list with respect to each of the one or more types of restriction information in accordance with the setting information, the content list including identifiers of one or more contents to which corresponding restriction information has been attached.

Here, the predetermined processing is processing to remove the restriction, and specifically processing to receive input of a password and, when the password matches a security code set in terms of a content or a device, update information having been attached to the content from information showing a state where a restriction is not removed to information showing a state where the restriction is removed. Meanwhile, in this description, a security code which is received from a user is termed as a password and a security code which is originally set to a content or a device is termed as a security code.

Also, the identifier is anything by which a user can recognize a content. For example, the identifier is a title name of the content.

Advantageous Effects of Invention

With the above-stated structure, since the content playback apparatus generates the list with respect to each of the one or more types of restriction information and displays the list, a user can easily recognize that what type of viewing restriction is put on contents.

Also, the content playback apparatus may further comprising: a state information storage unit storing removal state information that shows, for each content, whether the restriction on playback has been removed or not; a removal state update unit operable to, when the content playback apparatus performs the predetermined processing, regarding the content to which the restriction information has been attached, remove the restriction on playback by updating the removal state information so as to show that the restriction has been removed; and a playback unit operable to, upon reception of selection input from a user, and when the removal state information of a content specified by the selection input shows that the restriction has been removed, play back the content.

With the above-stated structure, the content playback apparatus can remove a viewing restriction put on a content, and play back the specified content.

Further also, in the content playback apparatus, the setting information may include, regarding the content to which the restriction information has been attached, time information about when the restriction is to be removed, and the removal state update unit starts processing to remove the restriction put on the content in accordance with a timing shown by the time information.

With the above-stated structure, the content playback apparatus can perform processing, regarding the content to which the restriction information has been attached, to remove a viewing restriction put on the content at an appropriate timing which is set by an operator or a user. For example, for a content which they desire to put a severer viewing restriction, the content playback apparatus performs processing to remove the restriction only after playback of the content is selected, or for a type of a content on which relatively slight viewing restriction is put, the content playback apparatus performs processing to remove the viewing restriction when display of a content list including the content is selected.

Further also, in the content playback apparatus, the removal state update unit, when a first type of restriction information has been attached to a content, may (i) collectively remove the restriction on playback put on all contents to which the first type of restriction information has been attached through the predetermined processing, and, when a second type of restriction information has been attached to a content, (ii) remove the restriction on playback put on each content to which the second type of restriction information has been attached through the predetermined processing one by one.

With the above-stated structure, regarding the content to which the first type of restriction information has been attached, the content playback apparatus allows all contents to which the first type of restriction information has been attached to be viewed only by removing a viewing restriction once. This can eliminate a user's bother of inputting a password to remove the viewing restriction each time they play back the content.

Also, regarding the content to which the second type of restriction information has been attached, the content playback apparatus performs processing to remove restriction information having been attached to each content. By doing so, viewing of each content can be restricted more severely. For example, from a viewpoint of parents, this enables a content that parents do not want their children to watch to be put a severer restriction when playing back the content.

Also, in the content playback apparatus, the setting information may include information about whether the identifiers of one or more contents are displayed or not, for each of the one or more types of the restriction information, and the display unit does not display a content list being composed of one or more contents to which a first type of restriction information has been attached until the restriction is removed.

With the above-stated structure, regarding the content to which the first type of restriction information has been attached, the content playback apparatus does not display the content list being composed of the content at first. Accordingly, users except a specific user cannot recognize that there is the content. For example, when the specific user does not want to be recognized by the other users that he/she views the content, existence of the content is not recognized by users except the specific user by providing the content with the first type of restriction information.

Further also, in the content playback apparatus, one or more content lists for the one or more types of restriction information may include a content list being composed of one or more contents to which restriction information has not been attached, and the display unit adds an identifier of a content whose restriction has been removed by the removal state update unit, to the content list being composed of the one or more contents to which restriction information has not been attached.

With the above-stated structure; regarding the content having been removed its viewing restriction, since the content playback apparatus displays the content by including the content in the content list on which the viewing restrictions are not originally put, a user can enjoy viewing the content without being aware of whether or not the viewing restriction had been put thereon.

Further also, in the content playback apparatus, the setting information may include information, depending on a type of the restriction information, about when, after removing a restriction, a state where the restriction is removed is brought back to a state where the restriction is not removed, and the removal state update unit updates the removal state information from the state where the restriction is removed to the state where the restriction is not removed in accordance with the setting information.

With the above-stated structure, after having removed a viewing restriction once, the content playback apparatus can bring the content back to the state where the viewing restriction put on the content is not removed. This can prevent a situation where the viewing restriction put on the content is indefinitely removed.

Also, the content playback apparatus may further comprising, a content obtaining unit operable to obtain the content to which restriction information has been attached.

With the above-stated structure, the content playback apparatus can obtain, from an external apparatus, a new content to which the restriction information has been attached. Accordingly, the content playback apparatus can classify the new content into a content list based on setting information and display an identifier thereof.

Also, the content playback apparatus may further comprising, a setting information obtaining unit operable to obtain setting information of a new type of restriction information which is not stored in the setting information.

With the above-stated structure, when the new type of the restriction information which is not held by the content playback apparatus has been attached to the obtained content, the content playback apparatus can obtain the setting information pertaining to the restriction information. This enables the content playback apparatus, even if it obtains a content to which the new type of the restriction information has been attached, to classify the content into the content list based on the newly obtained setting information and display an identifier thereof.

Also, the content playback apparatus may further comprising, an output unit operable to output one or more content lists to an external apparatus upon reception of access from the external apparatus.

With the above-stated structure, the content playback apparatus can output, to the external apparatus, the one or more content lists of one or more pieces of restriction information which it holds, and cause a user to recognize what types of contents it holds.

Further also, the content playback apparatus may further comprising, a removal information storage unit storing an identifier unique to the external apparatus and removal information, which corresponds to the identifier, to remove a restriction on playback, and upon reception of the access from the external apparatus, the removal state update unit obtains (i) the identifier unique to the external apparatus which is held by the external apparatus and (ii) the removal information held by the external apparatus, and removes the restriction on playback depending on whether a pair of the identifier and the removal information is stored in the removal information storage unit.

With the above-stated structure, the content playback apparatus can remove a viewing restriction based on the removal information which is the originally held by the external apparatus. Accordingly, a user can view a content without performing operation like input of a password as long as it meets conditions. For example, in the case where the external apparatus is a mobile phone, the content playback apparatus obtains user data which is held by the mobile phone such as data about a birth date. And, regarding a content to which restriction information pertaining to an age restriction has been attached, it removes the restriction if the user's age calculated from current time is higher than an age specified in the age restriction. In this way, the user can remove the playback restriction put on the content without inputting a password.

Further also, in the content playback apparatus, the restriction may be a restriction based on an age of a user viewing a content, the external apparatus holds first age information pertaining to an age of a user using the external apparatus, and outputs, along with the first age information, an instruction to remove the restriction put on the content to which the restriction information has been attached, and the content playback apparatus further comprising: a second age information storage unit holding second age information pertaining to an age of a user using the content playback apparatus; a judgment unit operable to judge, in response to the instruction output from the external apparatus, regarding the content to which restriction information has been attached, whether or not information requesting input of a security code to remove the restriction put on the content is displayed by using either one of the first age information or the second age information in accordance with a predetermined selection criterion, the predetermined processing is processing to, when the judgment unit judges affirmatively, display information requesting the input of the security code to remove the restriction put on the content, receive input of a valid security code from the user, and remove the restriction.

With the above-stated structure, the content playback apparatus can appropriately choose between the age information set to the external apparatus and the age information set to the content playback apparatus depending on a state of use, and remove the restriction. The content playback apparatus is considered to be used by a plurality of users. On the other hand, in the case where the external apparatus is a mobile phone, it is used by one user. When the content playback apparatus is used by a plurality of users, since the user whose age is the lowest among ages of the other users who use the content playback apparatus are often employed as a criterion, sometimes an age of a user who uses the mobile phone does not correspond to the age of the user employed as the criterion. In such a case, the content playback apparatus can remove a restriction put on a content in accordance with the age information set to either of apparatuses. For example, which of the age information pieces set to both apparatuses is employed can be switched depending on a period of time, or, if the age information set to the external apparatus is higher than the age information set to the content playback apparatus, it can employ the age information set to the external apparatus.

BRIEF DESCRIPTION OF THE DRAWINGS

FIG. 3 is a data conceptual diagram showing a configuration example of setting information 300.

FIG. 4 is a data conceptual diagram showing a configuration example of content management information 400.

FIG. 13 is setting information data attached to a content.

FIG. 14 is setting information 300 updated by being added the setting information data shown in FIG. 13.

FIG. 21 is a data conceptual diagram showing a configuration example of setting information 2100 in embodiment 3.

FIG. 28 shows a configuration of setting information 109a in embodiment 4.

FIG. 29 shows a configuration of setting information 109b in embodiment 4.

DESCRIPTION OF EMBODIMENTS

In the following, an embodiment of a content playback apparatus in the present invention is described with use of the attached drawings.

Embodiment 1

Figure 1:
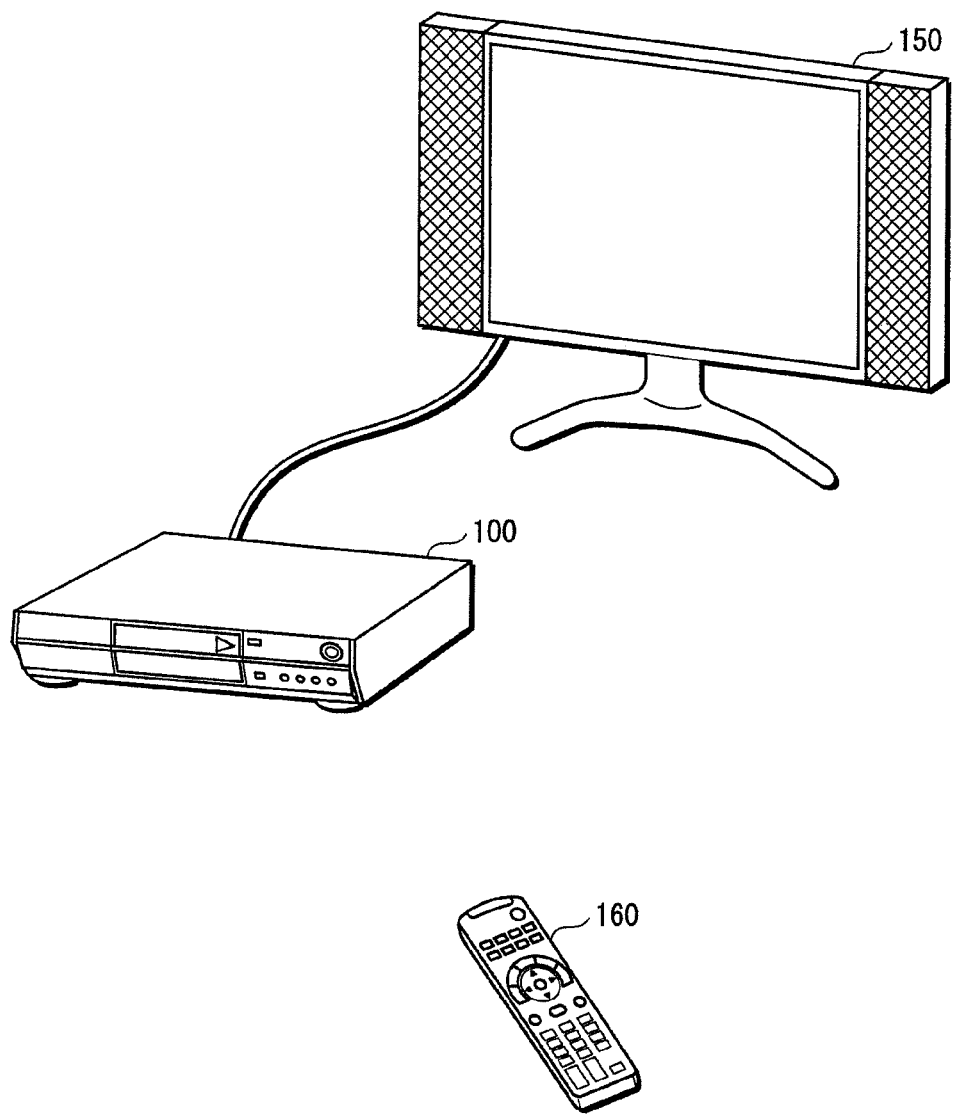
FIG. 1 shows usage of a content playback apparatus 100.

FIG. 1 is an appearance diagram showing usage of a content playback apparatus 100. The content playback apparatus 100 is an apparatus which can play back a movie content, and represented by, for example, a BD (Blu-ray) recorder and a DVD (Digital Versatile Disc) recorder. The content playback apparatus 100 is equipped with a function which a conventional content playback apparatus has. The content playback apparatus 100 is connected to a digital television 150, and outputs a content, which it holds, to the digital television 150 and outputs GUI (Graphical User Interface) showing a list of contents, which it holds.

Also, upon receiving a control signal from a provided remote control 160, the content playback apparatus 100 performs processing based on the control signal. For example, the content playback apparatus 100 outputs a movie content, records received broadcast and so on. The remote control 160 is for operating the content playback apparatus, and attached to the content playback apparatus. The configuration thereof is the same as that of a conventional remote control. Meanwhile, the content playback apparatus can be operated by a user pressing a key for input which is directly mounted on the content playback apparatus 100 (not illustrated).

Figure 2:
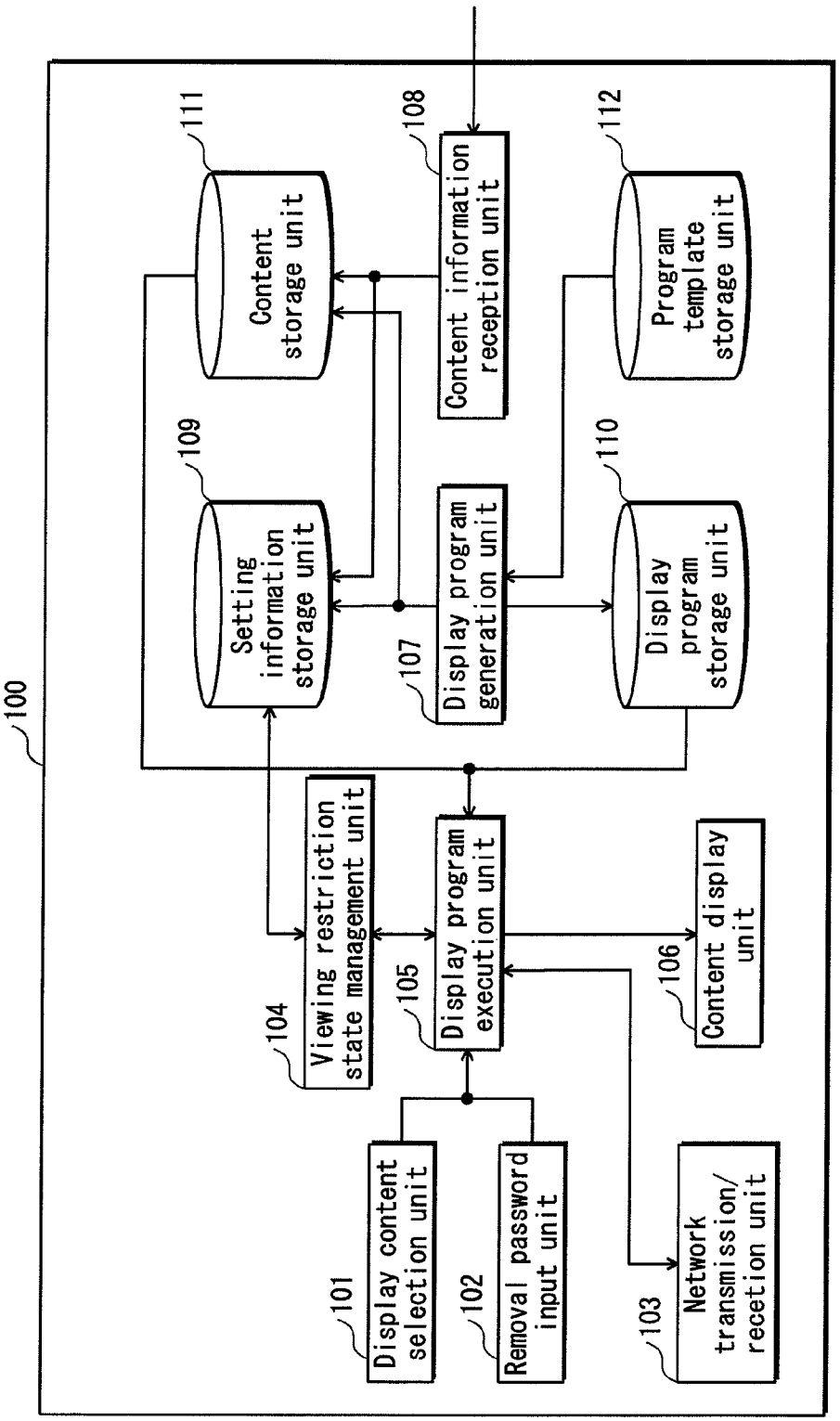
FIG. 2 is a block diagram showing a functional configuration of the content playback apparatus 100.

Here, details about the content playback apparatus 100 are described with use of FIG. 2.

FIG. 2 is a block diagram showing a functional configuration of the content playback apparatus 100. Conventional functions such as a recording unit for recording a content are not described in FIG. 2.

As shown in FIG. 2, the content playback apparatus 100 is composed of a display content selection unit 101, a removal password input unit 102, a network transmission/reception unit 103, a viewing restriction state management unit 104, a display program execution unit 105, a content display unit 106, a display program generation unit 107, a content information reception unit 108, a setting information storage unit 109, a display program storage unit 110, a content storage unit 111 and a program template storage unit 112.

The display content selection unit 101 has a function to receive selection operation about which content title is pointed by a cursor, based on a control signal which is output by operation performed by a user using the remote control 160, and to output the selection operation to the display program execution unit.

The removal password input unit 102 has a function to receive input of a password from the remote control 160, and to transmit the password to the display program execution unit 105.

The display content selection unit 101 and the removal password input unit 102 correspond to a communications interface for receiving a control signal from a conventional remote control and transmitting the control signal to the display program execution unit 105.

The network transmission/reception unit 103 has a function to allow the content playback apparatus 100 to transmit/receive operation and a command from an apparatus other than the remote control 160 provided to the content playback apparatus by using HTTP (Hyper Text Transfer Protocol). Also the network transmission/reception unit 103 stores a security code to authenticate whether or not it may receive operation from an external apparatus, when receiving an access from the external apparatus.

The network transmission/reception unit 103 has a function to authenticate whether or not the external apparatus is authorized to operate the content playback apparatus 100 when receiving an access from the external apparatus. The authentication is performed by judging whether or not a password received from the external apparatus matches a security code stored in the network transmission/reception unit 103. When the password and the security code match, the external apparatus which accesses the content playback apparatus 100 is judged to be authorized to operate the content playback apparatus 100.

When judging that the external apparatus is authorized to operate the content playback apparatus 100, the network transmission/reception unit 103 receives a GUI program to display a content list stored in the display program storage unit 110, and allows the external apparatus to be transmitted thereto the GUI program and allows the external apparatus to operate the GUI. Also, the network transmission/reception unit 103 has a function to receive input to the GUI through operation performed by the external apparatus, and to transmit the received operation to the display program execution unit 105.

The viewing restriction state management unit 104 has a function to manage information about whether a restriction is removed or not. The information is stored in setting information 200 which is stored in the setting information storage unit 109. The viewing restriction state management unit 104 has a function to transmit the information about whether or not the restriction is removed to the display program execution unit 105 based on restriction state information stored in the setting information 200. Also, the viewing restriction state management unit 104 has a function to update the restriction state information in the setting information 200 from "not removed" to "removed" based on a control signal showing that a restriction can be removed, which is received from the removal password input unit 102 or the network transmission/reception unit 103 through the display program execution unit 105. Further also, the viewing restriction state management unit 104 has a function to update the restriction state information from "removed" to "not removed" at an appropriate timing with reference to a column of a viewing restriction removal period in the setting information 200. Further also, the viewing restriction state management unit 104 has a function to transmit information about whether a viewing restriction put on a content specified by the display program execution unit 105 is removed or not with reference to the setting information, in response to a question from the display program execution unit 105.

The display program execution unit 105 has a function to read out a GUI program stored in the display program storage unit 110, and cause the content display unit 106 to display a GUI based on the GUI program. When receiving an instruction of playback of a content, the display program execution unit 105 asks the viewing restriction state management unit 104 whether or not a restriction is put on the content to be played back, and if the restriction is put, whether or not the restriction is removed.

Also, the display program execution unit 105 stores authentication information 510 showing a security code corresponding to a type of restriction information which has been attached to a content, and the display program execution unit 105 has a function to judge whether or not it removes a restriction depending on whether or not a value indicated by a password received by the removal password input unit 102 matches the security code corresponding to the type of restriction information having been attached to the content whose restriction is going to be removed. When judging that it removes the restriction, the display program execution unit 105 transmits a result of the judgment to the viewing restriction state management unit 104, and when judging that it does not remove the restriction, the display program execution unit 105 causes the content display unit 106 to display a GUI showing that the password is invalid. Details about the authentication information 510 are described later. Meanwhile, the display program execution unit 105 is assumed to hold an operation log which is a record of received operation and a control log which is a record of performed control.

When information showing that the restriction is removed is transmitted from the viewing restriction state management unit 104, the display program execution unit 105 reads out content data from the content storage unit 111, and outputs the content data to the content display unit 106. The content display unit 106 plays back the received content.

When information showing that a restriction is not removed is transmitted from the viewing restriction state management unit 104, the display program execution unit 105 causes the content display unit 106 to display a GUI for requesting input of a security code.

The content display unit 106 has a function to output the GUI transmitted from the display program execution unit 105 to the digital television 150.

The display program generation unit 107 has a function to generate a GUI program being a basis of image data to be output to the digital television 150 based on template data read out from the program template storage unit 112. Specifically, the display program generation unit 107 reads out the setting information 300 from the setting information storage unit 109, and generates a basic list of all types of viewing restriction to allocate each content title with reference to a viewing restriction type in the setting information 300. The basic list is a list for allocating each content title based on restriction information. And to allocate each content title to the basic list means to classify content titles by associating content titles with each other based on restriction information having been attached to each content, and add the classified content to the basic list.

The display program generation unit 107 reads out content management information 400 from the content storage unit 111, and allocates all the content titles in the content management information 400 to the corresponding basic list based on a restriction information type ID of each content. After allocating all the content titles, it stores, in the display program storage unit 110, a GUI program which is obtained by adding information included in each content list to template data.

The content information reception unit 108 has a function to obtain content data by wired or wireless network through the internet or the airwaves, and to store the obtained content data in the content storage unit 111. Also, when obtaining a content to which restriction information which is not included in setting information stored in the setting information storage unit 109 has been attached, the content information reception unit 108 adds setting information of the restriction information to the setting information 300, and updates the setting information 300. If new setting information is included in the content data, the setting information included in the content data is used.

The setting information storage unit 109 has a function to store the setting information 300. Details about the setting information 300 are described later.

The display program storage unit 110 has a function to store a GUI program generated by the display program generation unit 107.

The content storage unit 111 has a function to store content data.

The program template storage unit 112 has a function to store template data becoming the basis of a GUI generated by the display program generation unit 107. The template data includes pieces of information showing a background color, a placement position, a size, a color and the like of each item to be displayed like an icon indicating operation buttons on the remote control 160, and operation to be received. And a GUI program to be displayed based on the template data is generated by the display program generation unit 107. More specifically, the template data includes pieces of information showing a coordinate to which the icon is displayed, a coordinate to which a scroll bar is displayed, a shape of the scroll bar to be displayed, a display position of a basic list generated by the display program generation unit 107, a font and a display form to display content titles in the basic list, a display form of content title which is selectable. For example, the template data may be a program in which there is no information of content titles on a content list in a GUI program to display a GUI shown in FIG. 6.

Above is an explanation about each functional unit of the content playback apparatus 100.

<Data>

The following describes data treated by the content playback apparatus 100.

FIG. 3 is a data conceptual diagram showing an example of data configuration of setting information stored in the setting information storage unit 109.

The setting information 300 includes setting information to generate a GUI displaying a content list and information about whether or not a viewing restriction is removed.

As shown in FIG. 3, the setting information 300 is information including a restriction information type ID 301, a viewing restriction type 302, a viewing restriction removal timing 303, a viewing restriction removal range 304, a viewing restriction removal period 305, a display method before removing a viewing restriction 306, a display method after removing a viewing restriction 307, and a viewing restriction removal state 308, each of which is associated with each piece of restriction information.

The restriction information type ID 301 is an identifier to allow the content playback apparatus 100 to manage a type of the restriction information.

The viewing restriction type 302 is information showing a type of a viewing restriction and information to be a tab name in the content list. In FIG. 3, "No restriction" indicates that the viewing restriction is not put on a content, "R-15" indicates that a person under the age of 15 is prohibited from viewing the content, and "R-20" indicates that a person under the age of 20 is prohibited from viewing the content.

The viewing restriction removal timing 303 is information showing when the viewing restriction is removed, more specifically, information showing when a user is requested to input a password.

"At the time of first display" indicates that the user is requested to input the password to remove a restriction when the user selects display of a content list of each type. Whether or not the list is displayed for the first time after the content playback apparatus 100 is turned on is known by referring to a control log.

"At the time of menu item selection" indicates that the user is requested to input the password to remove the restriction when the user opens a menu and selects an item to input the password included in the menu.

The viewing restriction removal range 304 is information showing a content to be removed its restriction when a restriction put on the same type of content has been removed once. "All contents of the same type" indicates that the viewing restrictions put on all contents of the same type are removed by inputting the password once. In an example in FIG. 3, the viewing restrictions put on all contents specified as "R-15" are removed by inputting the password once. "Only the content" indicates that the viewing restriction put on only the content which is selected to be played back is removed, and as for a content specified as "R-20", the password is requested to be input each time playback is requested.

The viewing restriction removal period 305 is information showing until when the restriction is removed after the restriction put on a content of each type is removed.

"Power OFF" indicates that the viewing restriction is kept removed until the content playback apparatus 100 is turned off. That is, the viewing restriction state management unit 104 updates a viewing restriction removal state from "removed" to "not removed" at a timing when the content playback apparatus 100 is turned off.

"GUI non display" indicates that the viewing restriction is kept removed as long as the GUI is displayed. That is, the viewing restriction state management unit 104 updates a viewing restriction removal state from "removed" to "not removed" at a timing when a GUI is not displayed, for example, at a timing when a content is selected and the content is played back. Meanwhile, the restriction put on a content being played back is kept removed until the playback is stopped. The playback is not interrupted by the update. However, input of the password is requested again by the content playback apparatus 100 when the playback of the content is finished or interrupted.

A display method before removing a viewing restriction 306 is information defining whether or not a list of content titles of each type is displayed at a timing when a GUI is displayed for the first time.

"Program name display" indicates that the list of content titles of each type is displayed at the timing when the GUI is displayed for the first time.

"Tab display" indicates that a tab showing that there are one or more contents of each type indicated by the tab is displayed on a GUI, and "tab non display" indicates that a tab showing that there are one or more contents of a type indicated by the tab is not displayed on the GUI.

The display method after removing a viewing restriction 307 is information defining a display method of content titles of each type when the viewing restriction put on the content is removed.

"Included in no restriction display" indicates that a title of a content whose restriction is removed is included in a content list on which a restriction is not put when a tab of the no restriction is selected. "Not included in no restriction display" indicates that the title of the content whose restriction is removed is not included in a content list on which a restriction is not put when a tab of the no restriction is selected.

"Tab addition" indicates that a tab, which is not displayed before being removed the viewing restriction, is displayed.

The viewing restriction removal state 308 is information showing whether or not the viewing restriction put on a content is removed.

As shown in FIG. 3, for example, the viewing restriction type corresponding to the restriction information type ID "3" is "R-20", and the viewing restriction removal range is shown as "only the content". It indicates that the restriction put on only the selected content is removed. And the viewing restriction period corresponding to the restriction information type ID "3" is "one playback". It indicates that the viewing restriction put on the selected content goes back to the not removed state after the viewing restriction is removed and the content is played back once. Also, the display method before removing a viewing restriction corresponding to the restriction information type ID "3" is "program name non display" and "tab non display", and the display method after removing a viewing restriction is "not included in no restriction display" and "tab addition". That is, a content list specified as "R-20" is not displayed until a user inputs a password set in connection with "R-20". And the list of content titles specified as "R-20" is displayed only after receiving an instruction of predetermined processing, which is performed by receiving, from a user, an instruction to display all content lists from the menu and receiving a password. And the viewing restriction removal state corresponding to the restriction information type ID "3" is "removed" here. Meanwhile, the viewing restriction removal state is information which can be updated by the viewing restriction state management unit 104 when a user inputs a password, and the content playback apparatus is turned off.

The following describes content management information 400 for managing each content held by the content playback apparatus 100 with use of FIG. 4.

FIG. 4 is a data conceptual diagram showing an example of a data configuration of the content management information 400.

The content management information 400 is composed of a content management ID 401, a content title 402, a restriction information type ID 403, a recording date and time 404, a distribution source 405, and viewing information 406. Besides these, information like a total playback time of a content may be included in the content management information 400.

The content management ID 401 is an identifier for management which is allocated to a content to allow the content playback apparatus 100 to manage the content. The content management ID 401 is associated with actual data of each content, and stored in the content storage unit 111 (not illustrated).

The content title 402 is information showing a content title which is used when displaying a list.

The restriction information type ID 403 is an identifier to allow the content playback apparatus 100 to manage a type of restriction information. The restriction information type ID 403 is the same as the restriction information type ID 301 shown in FIG. 3.

The recording date and time 404 is information showing a date and time the content playback apparatus 100 records the content. When the content playback apparatus 100 receives and records a broadcast, the recording date and time 404 shows a period of time and, when the content playback apparatus 100 had been obtained the content by using a content distribution service, it shows a time when the content is obtained.

The distribution source 405 is information showing a distribution source which provides the content. The distribution source 405 shows a channel which receives a broadcast when receiving and recording the broadcast, and it shows a company name which provides a content distribution service when obtaining the content by using the content distribution service.

The viewing information 406 is information showing whether or not the content playback apparatus 100 has played back the content. When the content has been played back, the viewing information 406 is shown as "viewed", and when the content has not been played back, it is shown as "not viewed".

For example, the content title corresponding to the content management ID "0170" is "disparate martial art F1" and the restriction information type thereof is "2". And content data indicated by the content management ID "0170" is stored in the content storage unit 111 at "09:29 on Feb. 19, 2008", and the content is distributed by a "company C". According to the viewing information, the content has been "not viewed".

The following describes authentication information 510 which is used to allow the content playback apparatus 100 to remove a viewing restriction put on a content.

Figure 5:
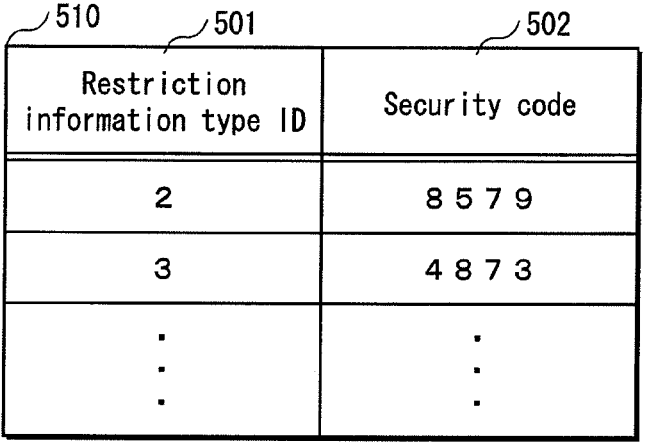
FIG. 5 is a data conceptual diagram showing a configuration example of authentication information 510.

FIG. 5 is a data conceptual diagram showing an example of a data configuration of the authentication information 510.

As shown in FIG. 5, the authentication information 510 is data including a restriction information type ID 501 and a security code 502 corresponding with each other. The authentication information 501 is stored in a secure memory held by the display program execution unit 105 (not illustrated). The authentication information 510 is referred by the viewing restriction state management unit 104 when it makes a comparison with a password input by a user to remove the viewing restriction.

The restriction information type ID 501 is an identifier to allow the content playback apparatus 100 to manage a type of restriction information. The restriction information type ID 501 is the same as the restriction information type ID 301 shown in FIG. 3.

The security code 502 shows a number which a user should input to remove a viewing restriction put on a content. Here, the security code 502 is shown in four figures.

Here, for example, the security code corresponding to the restriction information type ID "2" is "8579".

FIG. 13 is a data conceptual diagram showing a data configuration example of setting information data attached to a content of new restriction information type when the content playback apparatus 100 obtains the content.

FIG. 14 is a data conceptual diagram showing a data configuration example of setting information 300 updated by being added setting information which is newly obtained. As can be seen from transition from FIG. 3 to FIG. 14, setting information data shown in FIG. 13 is added.

Above is an explanation about data managed by the content playback apparatus 100.

<Operation>

Figure 15:
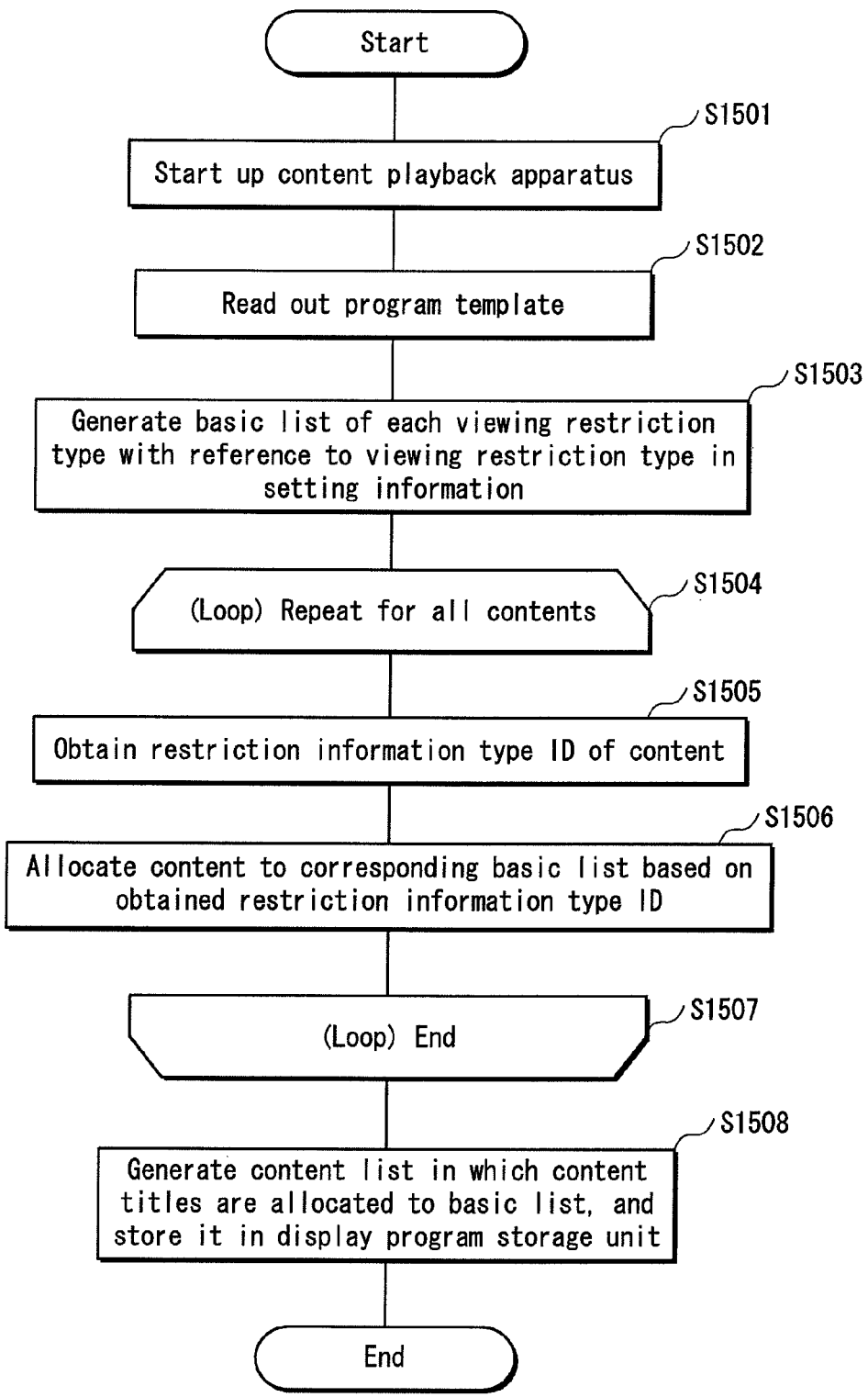
FIG. 15 is a flow chart showing operation which is performed when the content playback apparatus 100 generates the GUI.

The following describes operation which is performed when the content playback apparatus 100 in this embodiment generates a GUI with use of a flow chart shown in FIG. 15.

First, a user presses a power switch of the content playback apparatus 100 and starts up the content playback apparatus 100 (step S1501).

Then the display program generation unit 107 reads out a program template from the program template storage unit 112 (step S1502).

Next, the display program generation unit 107 generates a basic list of each viewing restriction type with reference to the viewing restriction type 302 in the setting information 300 (step S1503). In a case of the setting information 300 shown in FIG. 3, it generates at least a basic list of "no restriction", a basic list of "R-15", and a basic list of "R-20".

The display program generation unit 107 repeats, step S1505 and S1506 for all contents stored in the content storage unit 111 in order of increasing an ID number of the content management ID in the content management information 400 (step S1504).

The display program generation unit 107 obtains the restriction information type ID of a content to be processed with reference to the content management ID of the content in the content management information 400 (step S1505).

The display program generation unit 107 allocates the content title of the content to the basic list to which the obtained restriction information type ID corresponds (step S1506).

When the display program generation unit 107 finished allocating the content titles of all contents (step S1507), the display program generation unit 107 generates a GUI program in which the content titles are allocated, and stores the GUI program in the display program storage unit 110. However, at this time, a basic list to which no content title is allocated is deleted. And, the display program generation unit 107 makes a content list in data form in which remaining data of each basic list can be displayed as a list and generates a GUI program which is obtained by adding the content list to template data.

The generated GUI data is read out by the display program execution unit 105, and image data which is generated based on the GUI program is output to the digital television 150 by the content display unit 106.

Figure 16:
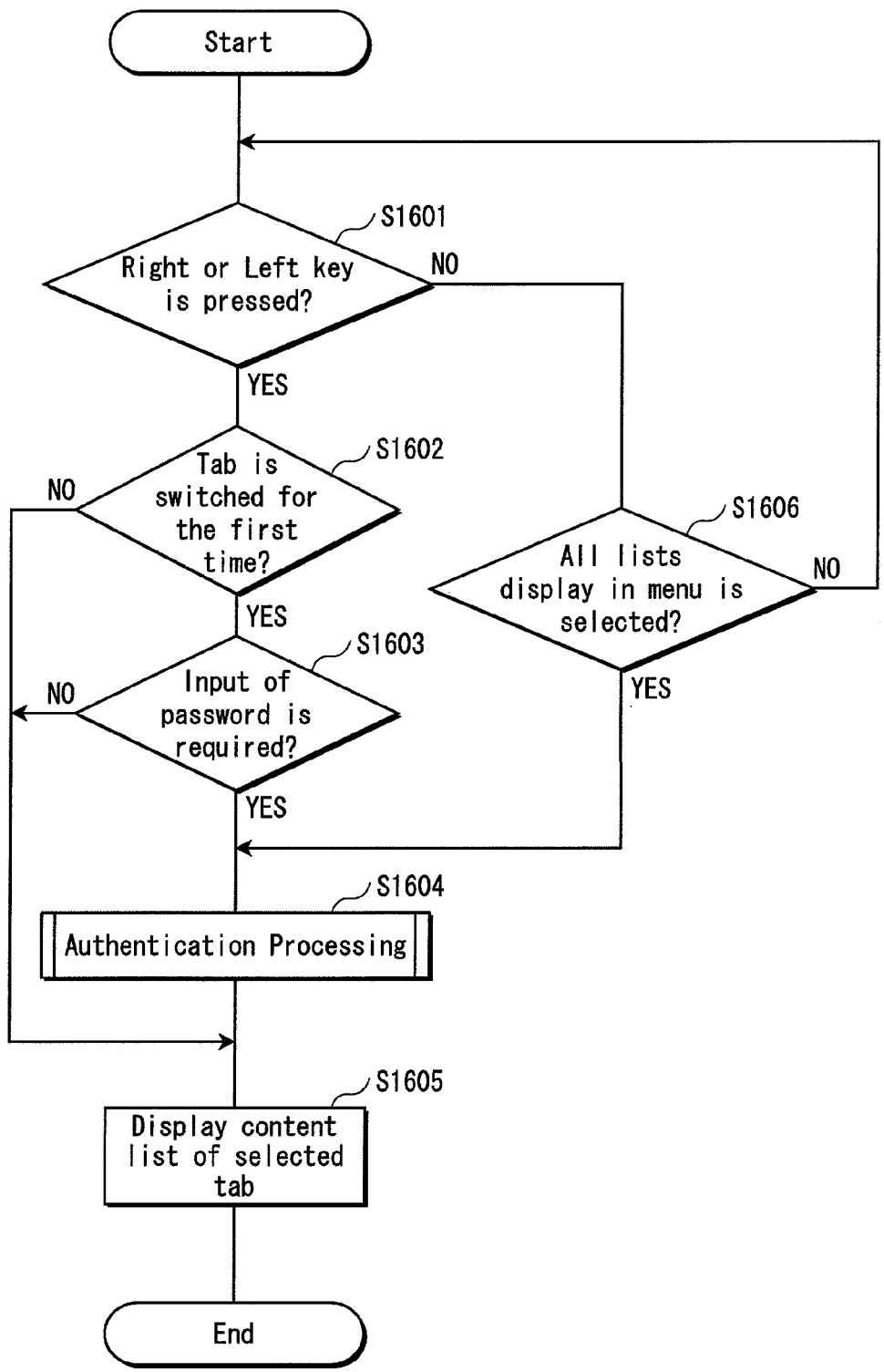
FIG. 16 is a flow chart showing operation based on operation received by a user when the content playback apparatus 100 displays the GUI and especially operation pertaining to authentication.
Figure 17:
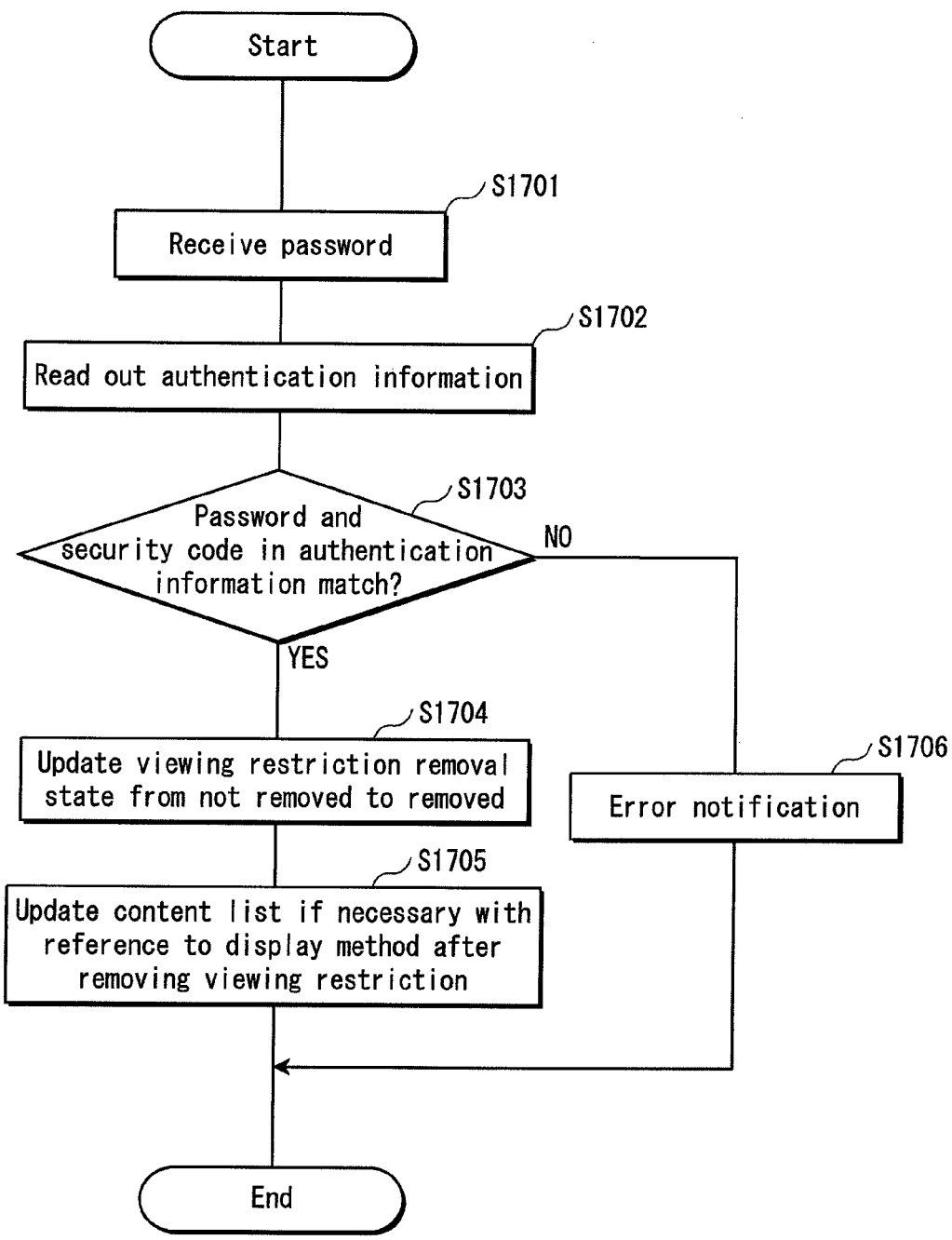
FIG. 17 is a flow chart showing details of the operation pertaining to the authentication performed by the content playback apparatus 100.

The following describes operation which is performed when the content playback apparatus 100 in this embodiment performs authentication with use of flow charts shown in FIG. 16 and FIG. 17.

The content playback apparatus 100 is ready to receive input from a user.

The display content selection unit 101 in the content playback apparatus 100 detects whether or not it receives, from the remote control 160, a control signal based on pressing of a right or left key of direction key mounted thereon (step S1601). The pressing of the right key or the left key indicates tab switching, and a content list to be displayed is determined depending on the number of times the right or left key is pressed.

When the right or left key on the remote control 160 is pressed (YES in step S1601), the display content selection unit 101 determines which of content lists is to be displayed based on the number of times the right or left key is pressed, and requests the display program execution unit 105 to display the determined content list.

The display program execution unit 105 judges whether or not the content list corresponding to the selected tab is displayed for the first time based on an operation log and a control log (step S1602).

When the content list corresponding to the selected tab is displayed for the first time (YES in step S1602), the display program execution unit 105 asks the viewing restriction state management unit 104 whether or not input of a security code is required by transmitting the restriction information type ID of the content list (step S1603). The viewing restriction state management unit 104 judges whether or not the input of the security code is required based on the viewing restriction removal state 308 in the setting information 300. When the viewing restriction removal state is shown as "removed", the viewing restriction state management unit 104 does not judge that the input of the security code is required. And when the viewing restriction removal state is shown as "not removed", it judges that the input of the security code is required.

When being transmitted information showing that the input of the security code is required from the viewing restriction state management unit 104 (YES in step S1603), authentication processing is performed (step S1604). Details about the authentication processing are described later with use of a flow chart in FIG. 17.

Then the display program execution unit 105 obtains a GUI program of the content list corresponding to the selected tab from the display program storage unit 110, and transmits the GUI program to the content display unit 106. The content display unit 106 outputs data based on the obtained GUI program, and display on a screen of the digital television 150 is updated (step S1605).

When judging that the content list corresponding to the selected tab is not displayed for the first time in step S1602 (NO in step S1602) or when judging that the input of the security code is not required in step S1603 (NO in step S1603), the authentication processing is not performed and processing in step S1605 is performed.

When the display content selection unit 101 does not detects a control signal showing that the right or left key is pressed (NO in step S1601) and display of all the lists some of which are not displayed is selected from a menu (YES in step S1606), the content playback apparatus 100 performs the authentication processing (step S1604).

Meanwhile, at a timing when playback of a content is selected and the playback is finished, or when the content playback apparatus 100 is turned off, the viewing restriction state management unit 104 updates, according to information of the viewing restriction removal period in the setting information 300, a viewing restriction removal state from "removed" to "not removed" if necessary.

Operation pertaining to display of a GUI other than operation mentioned above is not described here because the operation is the same as that performed by the conventional content playback apparatus 100.

The following described details about the authentication processing performed in step S1604 in FIG. 16 with use of a flow chart in FIG. 17.

The removal password input unit 102 in the content playback apparatus 100 receives a password by a user operating the remote control 160 (step S1701). The removal password input unit 102 transmits the received password to the display program execution unit 105. The display program execution unit 105 reads out the authentication information 510 (step S1702), and judges whether or not the received password and a security code match with each other. The security code corresponds to a type of a content which is selected to be removed its restriction (step S1703).

When judging that the input password and the security code match (YES in step S1703), the display program execution unit 105 transmits a result of the judgment to the viewing restriction state management unit 104. In response to this, the viewing restriction state management unit 104 updates the viewing restriction removal state in the setting information 300 from "not removed" to "removed" (step S1704). The content playback apparatus 100 can play back the content, because the viewing restriction removal state of the content is "removed".

And the display program execution unit 105 obtains, form the viewing restriction state management unit 104, the display method after removing a viewing restriction put on a content whose viewing restriction is removed, and updates a content list if necessary (step S1705). The updated content list is output to the digital television 150 as an updated GUI in accordance with instructions of the display program execution unit 105.

When judging that the password and the security code does not match (NO in step S1703), the display program execution unit 105 causes the content display unit 106 to display an error message indicating that the password is invalid.

Above is the details about the authentication processing.

Figure 18:
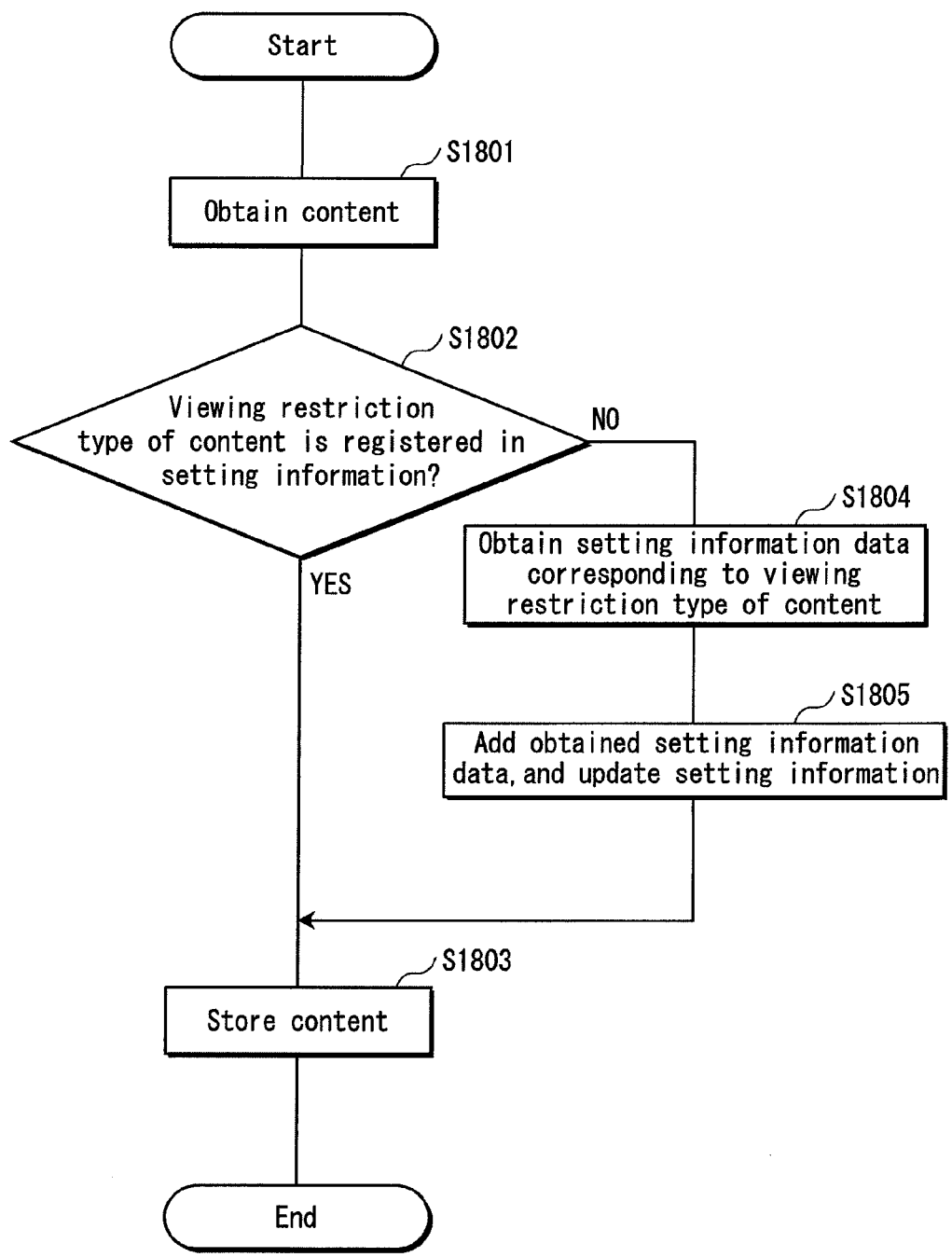
FIG. 18 is a flow chart showing operation which is performed when the content playback apparatus 100 obtains a new content.

The following describes operation which is performed when another content is newly obtained with use of a flow chart in FIG. 18.

The content information reception unit 108 obtains new content data specified in accordance with a control signal based on instructions of a user (step S1801).

The content information reception unit 108 accesses the setting information storage unit 109, and detects whether or not the viewing restriction type of the obtained content data is registered in the setting information 300 (step S1802).

When it is registered in the setting information (YES in step S1802), the content information reception unit 108 stores the obtained content data to the content storage unit 111, and updates the content management information 400 (step S1803).

When the viewing restriction type of the obtained content is not registered in the setting information 300 (NO in step S1802), the content information reception unit 108 obtains setting information data shown in FIG. 13 which is attached to the content data (step S1804).

And the content information reception unit 108 adds the obtained setting information data to the setting information 300, and updates the setting information 300 (step S1805). Then the content information reception unit 108 stores the content in the content storage unit 111 (step S1803). By performing operation of FIG. 18, the display program generation unit 107 can generate a content list of all restriction information type, because, even if the content playback apparatus 100 obtains a content to which anew type of restriction information has been attached, the setting information data of the new type of restriction information is added to the setting information 300.

<Example of Display Update>

Figure 19:
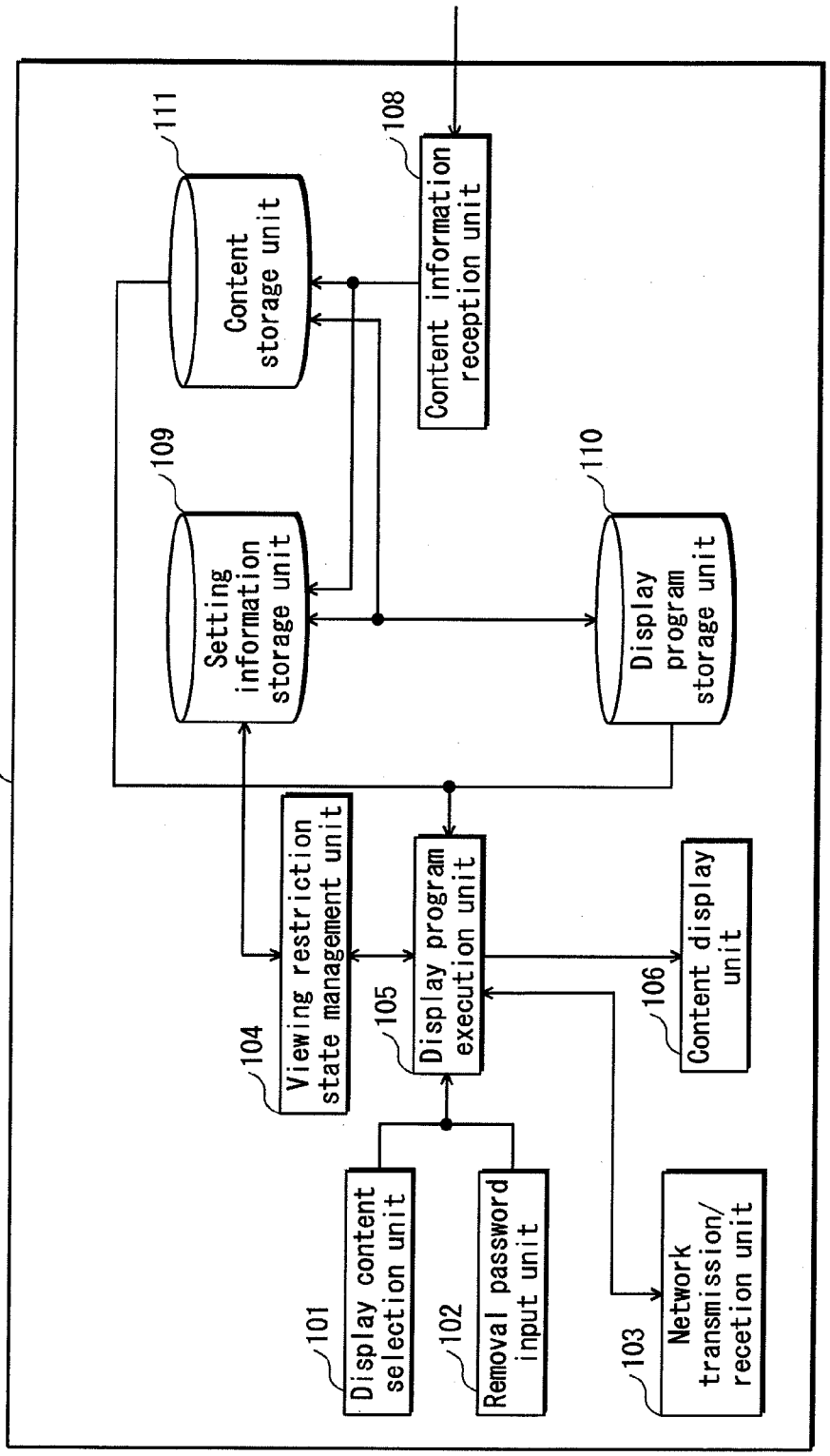
FIG. 19 is a block diagram showing a functional configuration of a content playback apparatus 200 in embodiment 2.

Finally, a display example of GUI which varies by performing operation based on flow charts shown in FIG. 17-19 is described with use of screen views shown in FIG. 6-12.

Figure 6:
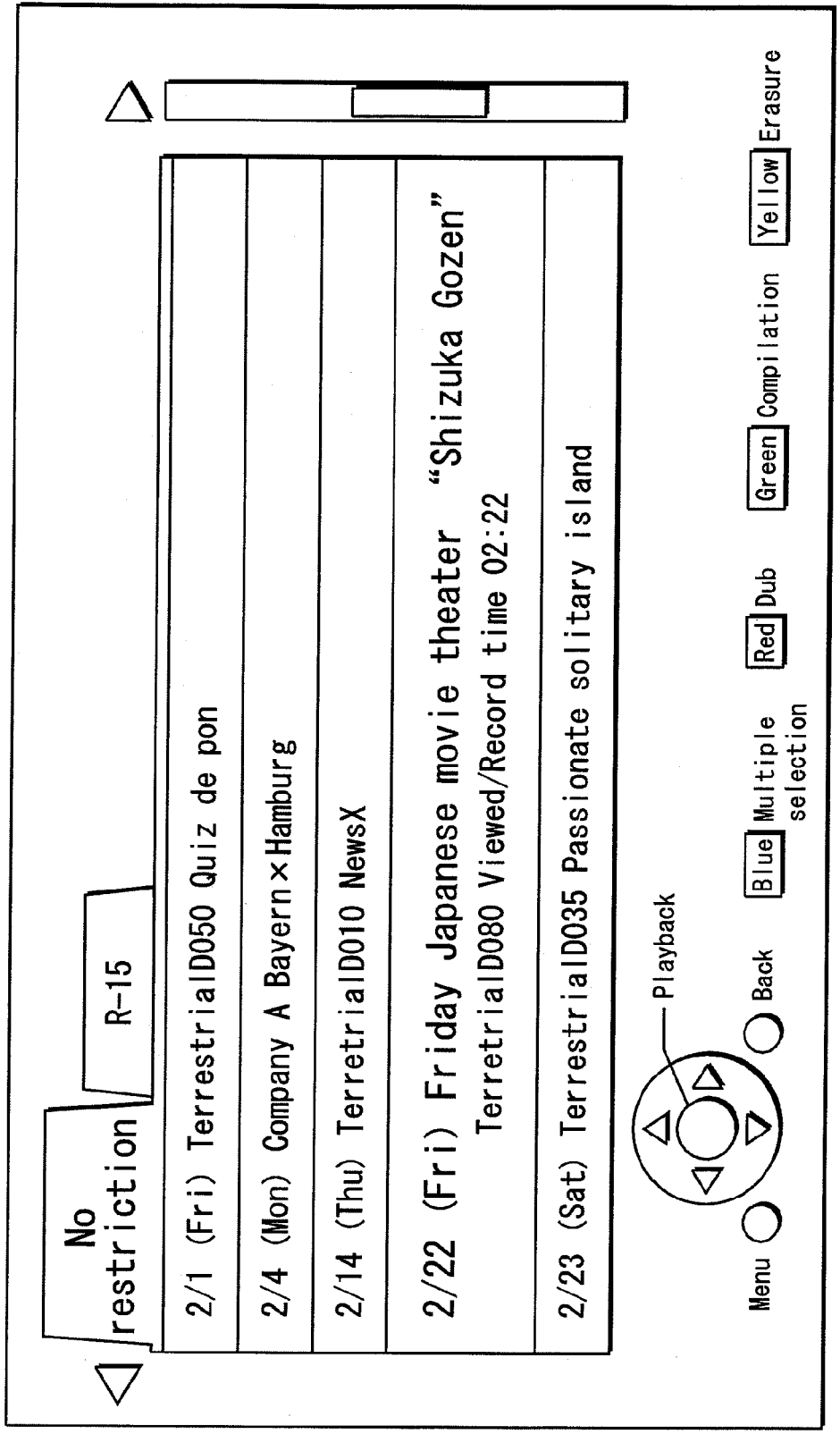
FIG. 6 is a display example of GUI displayed on a digital television 150 and a screen view when the GUI is displayed first.

FIG. 6 shows a GUI which is displayed first when the content playback apparatus 100 is started up. FIG. 6 shows the GUI which is generated in accordance with the setting information 300 shown in FIG. 3 and the content management information 400 shown in FIG. 4.

As can be seen from the drawing, a font of a content title which is selectable is displayed to be bigger than a font of the other content titles, and detailed information thereof is displayed so that it is easy to read.

With the conventional technology, a user cannot recognize whether or not the restriction information has been attached to a content. However, in the present invention, the user can recognize at first sight whether or not the restriction information has been attached to a content, and, if it has been attached, what type of restriction information has been attached, because content lists each of which corresponds to each piece of restriction information are displayed.

As can been seen from the content management information 400 in FIG. 4 and FIG. 6, "flamy smile" and "disparate martial art F1" are not displayed in a content list of "no restriction". Also, in FIG. 6, a tab of "R-20" is not displayed. This is because the display method before removing a viewing restriction corresponding to "R-20" is "program name non display" in the setting information 300 in FIG. 3.

In FIG. 6, the other content titles can be seen by scrolling a scroll bar at the side of the content list. And a direction key, a red key and the like displayed below the content list indicates a simplified operating manual showing what kind of control can be executed by pressing each button on the remote control 160.

Figure 7:
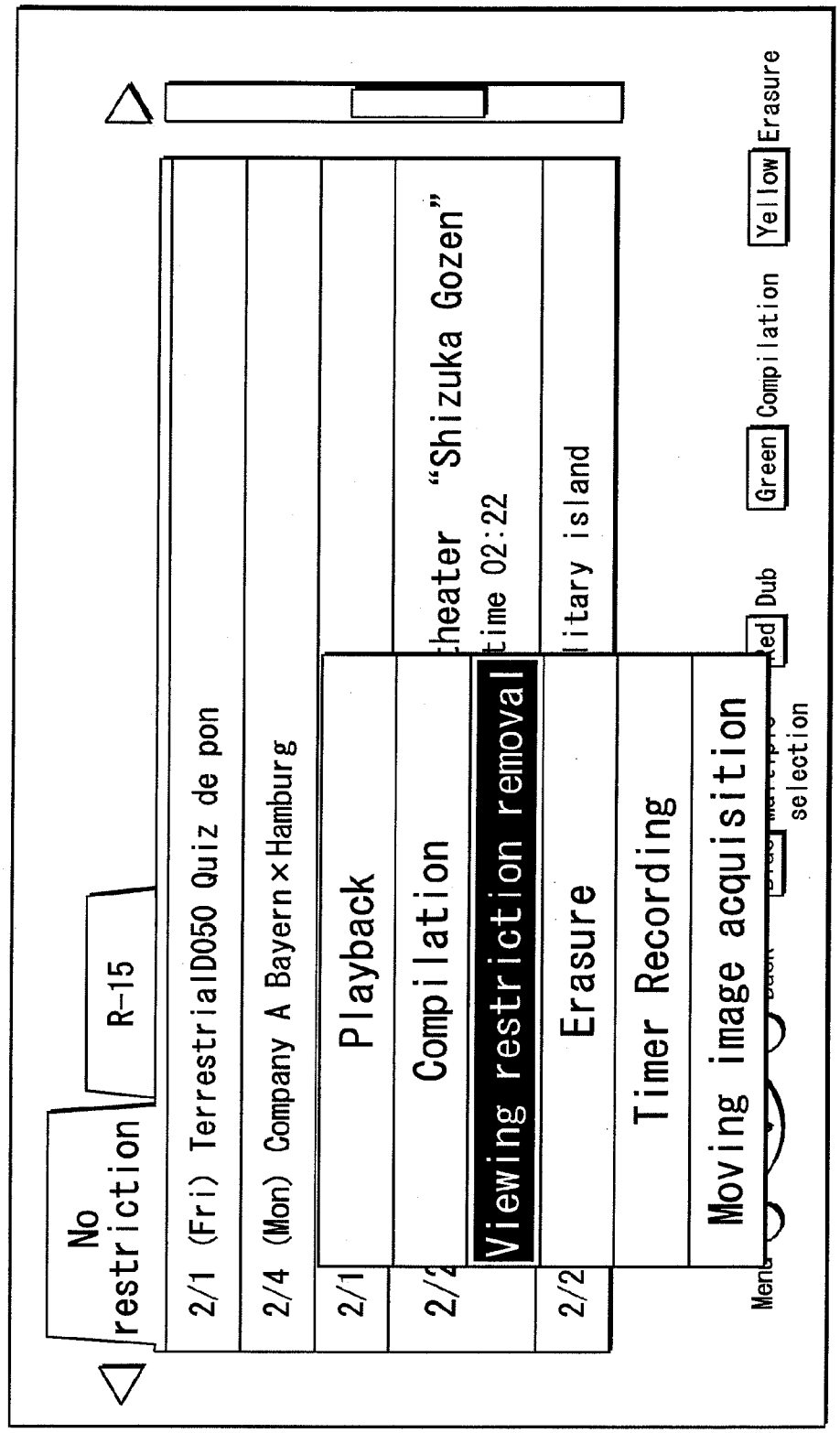
FIG. 7 is a screen view when a menu is displayed while the GUI of FIG. 6 is displayed.

FIG. 7 shows a screen view when a user presses a menu button on the remote control 160 while a screen view in FIG. 6 is displayed.

As shown in FIG. 7, a menu list is displayed by pressing the menu button. The menu list includes options like "playback", "compilation", "viewing restriction removal" and the like. The selectable menu is highlighted.

Figure 8:
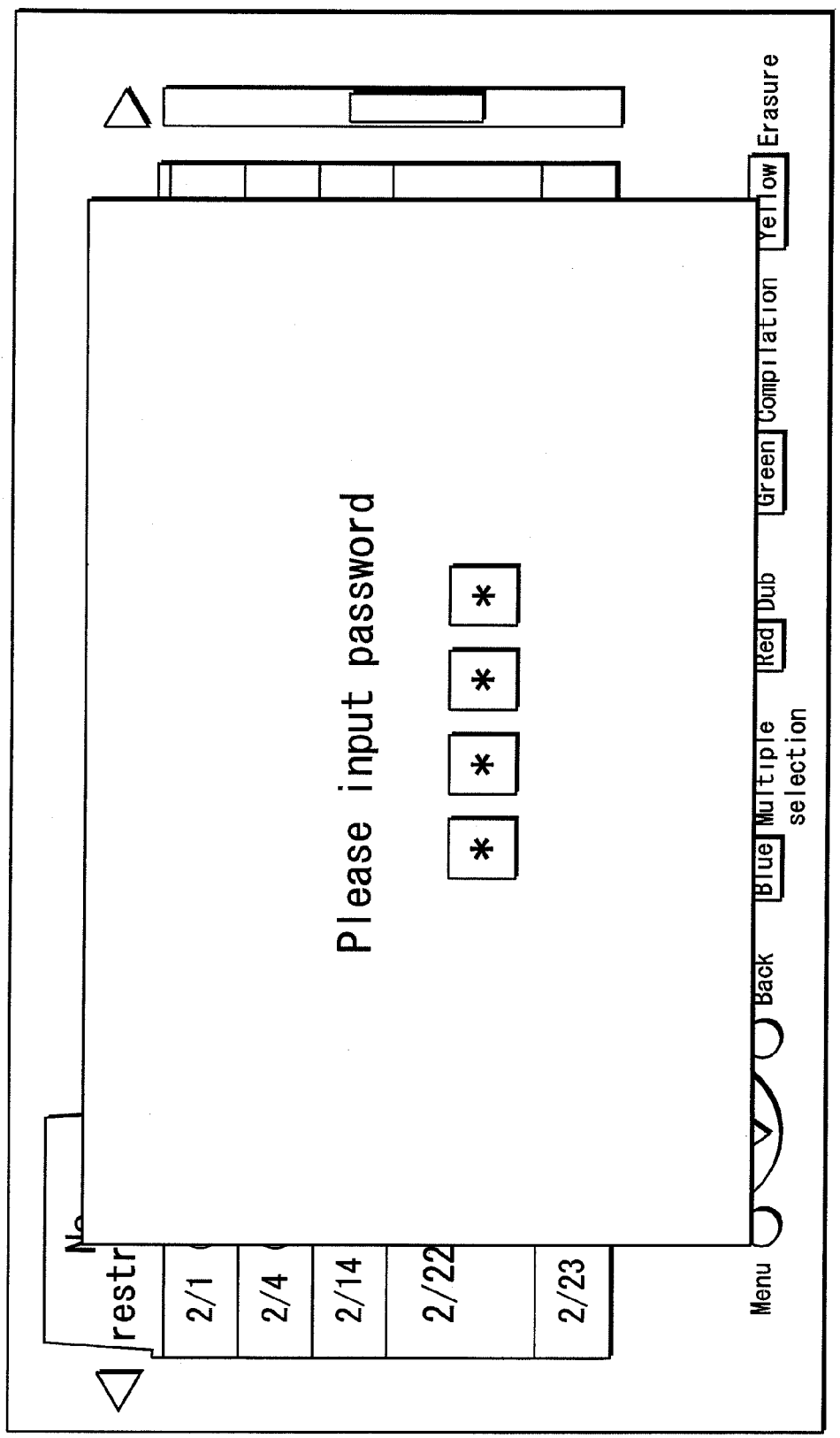
FIG. 8 is a screen view when the GUI requesting a security code, which is displayed upon display of viewing restriction removal is selected from a menu while the GUI of FIG. 7, is displayed.

When viewing restriction removal shown in FIG. 7 is selected, as shown in FIG. 8, the display program execution unit 105 causes the content display unit 106 to display a GUI requesting input of a password.

Figure 9:
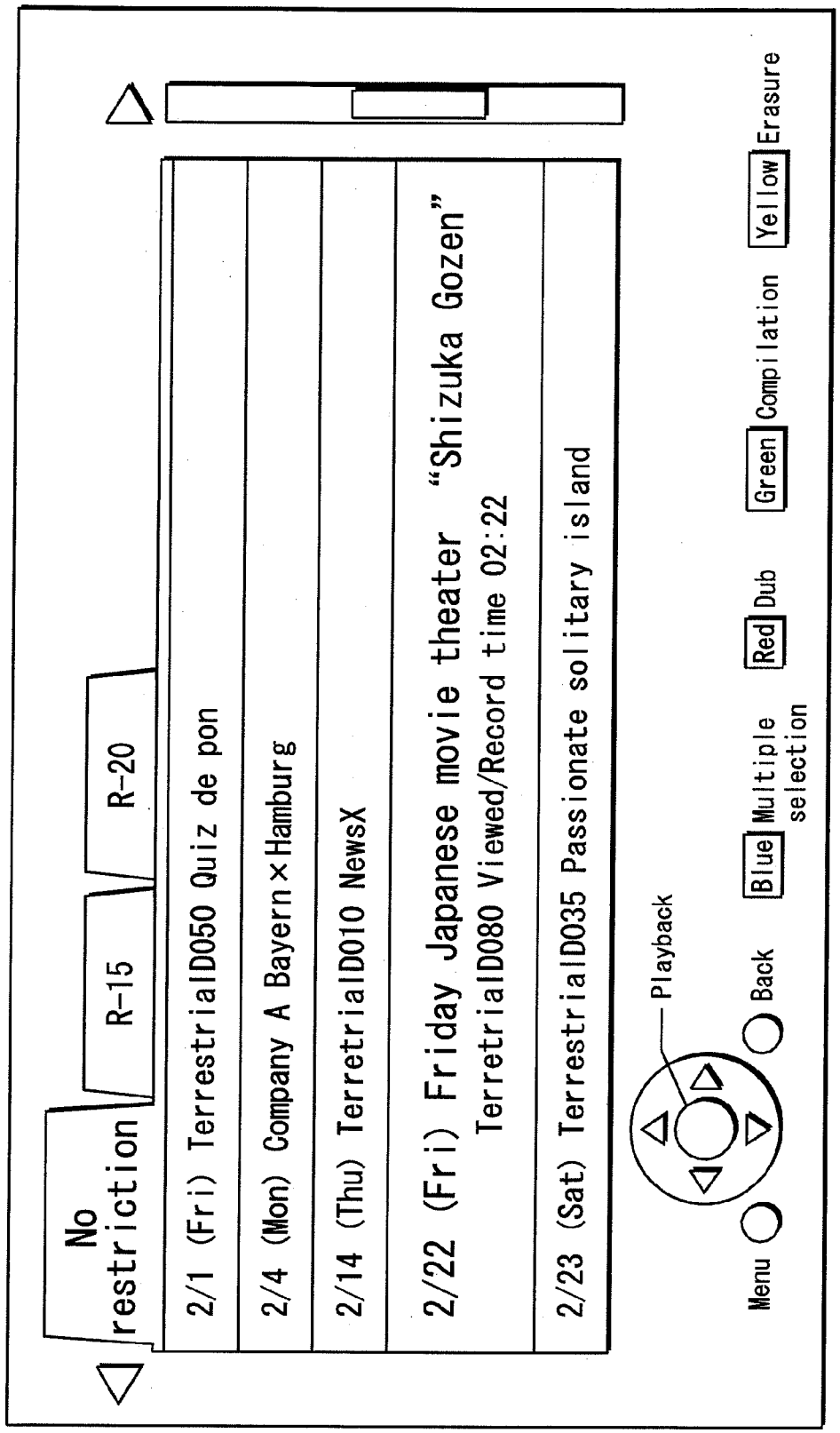
FIG. 9 is a screen view when a valid security code is input in FIG. 8.

In a screen view in FIG. 8, when a user inputs a valid password by using the remote control 160, the viewing restriction state management unit 104 updates the restriction removal state information in the setting information 300 to "removed", and the content display unit 106 displays a GUI shown as a screen view in FIG. 9.

As can be seen from transition from FIG. 6 to FIG. 9, a tab of "R-20" is newly displayed. Note that an actual content list specified as "R-20" is simply not displayed, and it is preliminarily generated by the display program generation unit 107 and stored in the display program storage unit 110.

Suppose that a user presses a right key on the remote control 160 once while a screen view in FIG. 9 is displayed. This causes a tab of "R-15" to be selected, and a GUI shown as a screen view in FIG. 10 is displayed.

Figure 10:
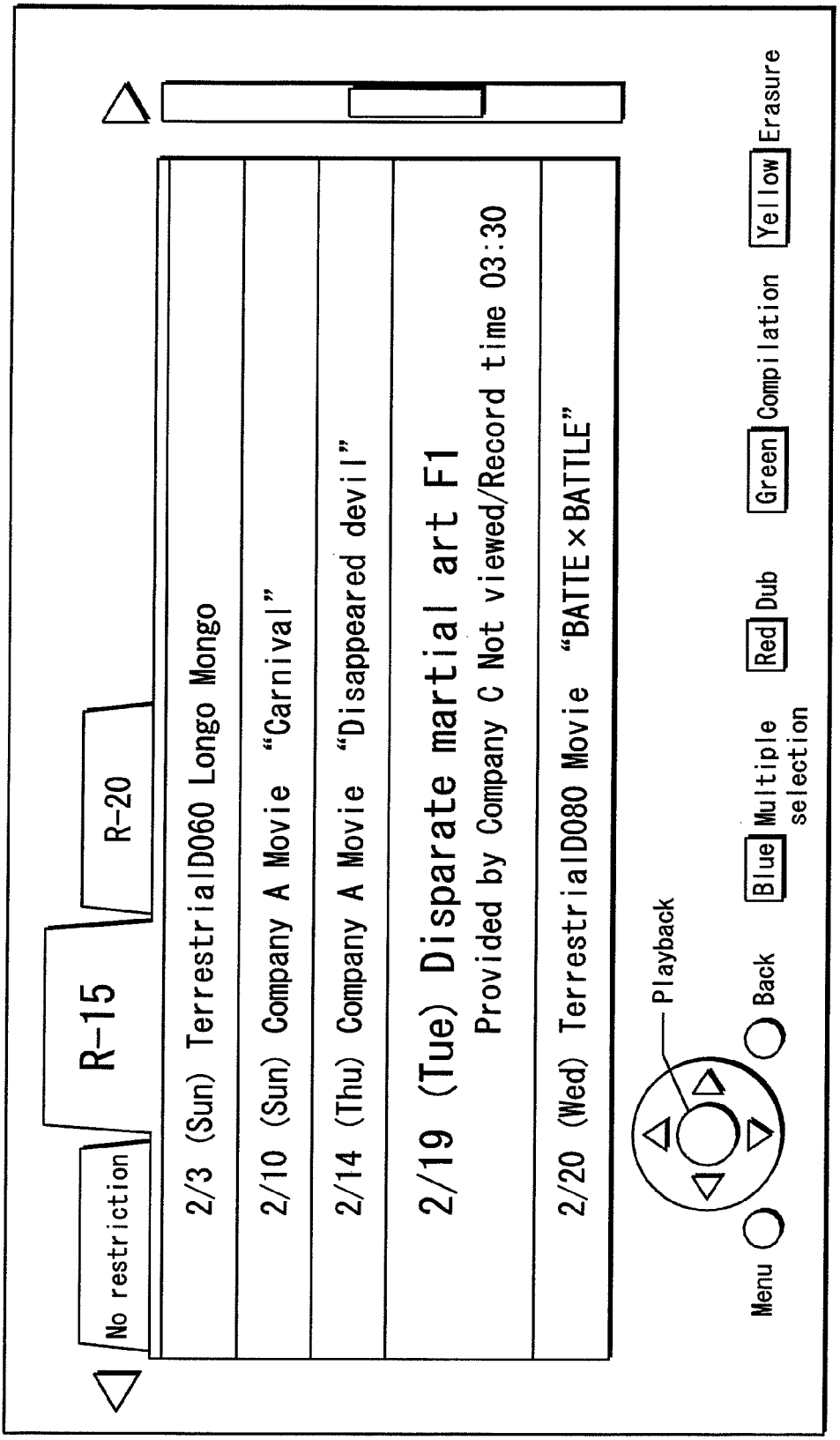
FIG. 10 is a screen view when a direction key is pressed to switch a tab while the GUI in FIG. 9 is displayed.

As can be seen from FIG. 10, a content list specified as "R-15" includes only content titles whose restriction information type ID in the content management information 400 is "2", and content titles whose restriction information type ID in the content management information 400 is "1" or "3" are not included.

Figure 11:
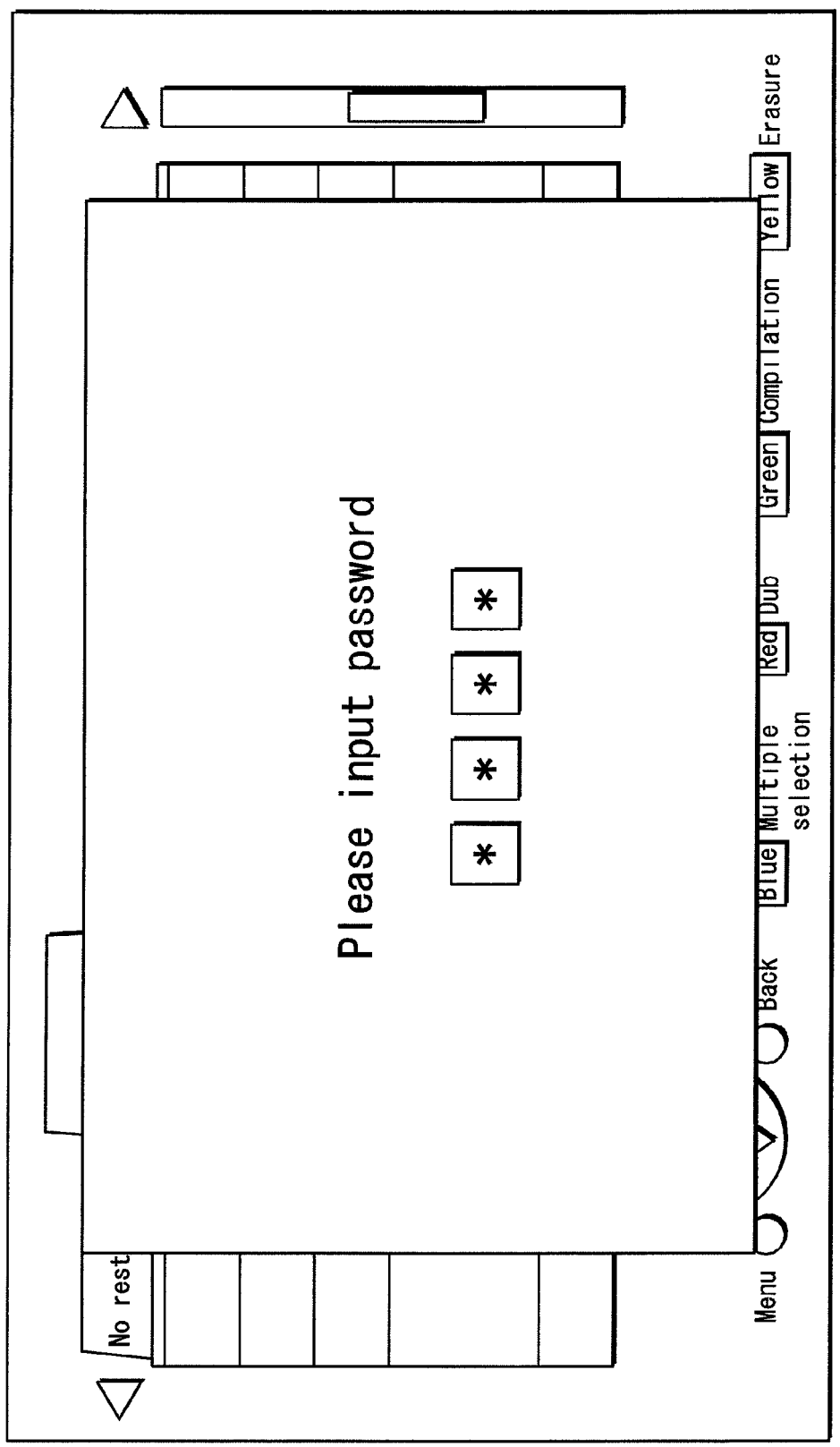
FIG. 11 is a screen view when the GUI requesting a security code, which is generated when the switching of FIG. 10 is performed for the first time since the GUI was displayed, is displayed.

In FIG. 10, when the content list specified as "R-15" is displayed for the first time, as shown in FIG. 11, input of a password is requested based on information shown as "at the time of first display" in the viewing restriction removal timing corresponding to "R-15" in the setting information 300.

Figure 12:
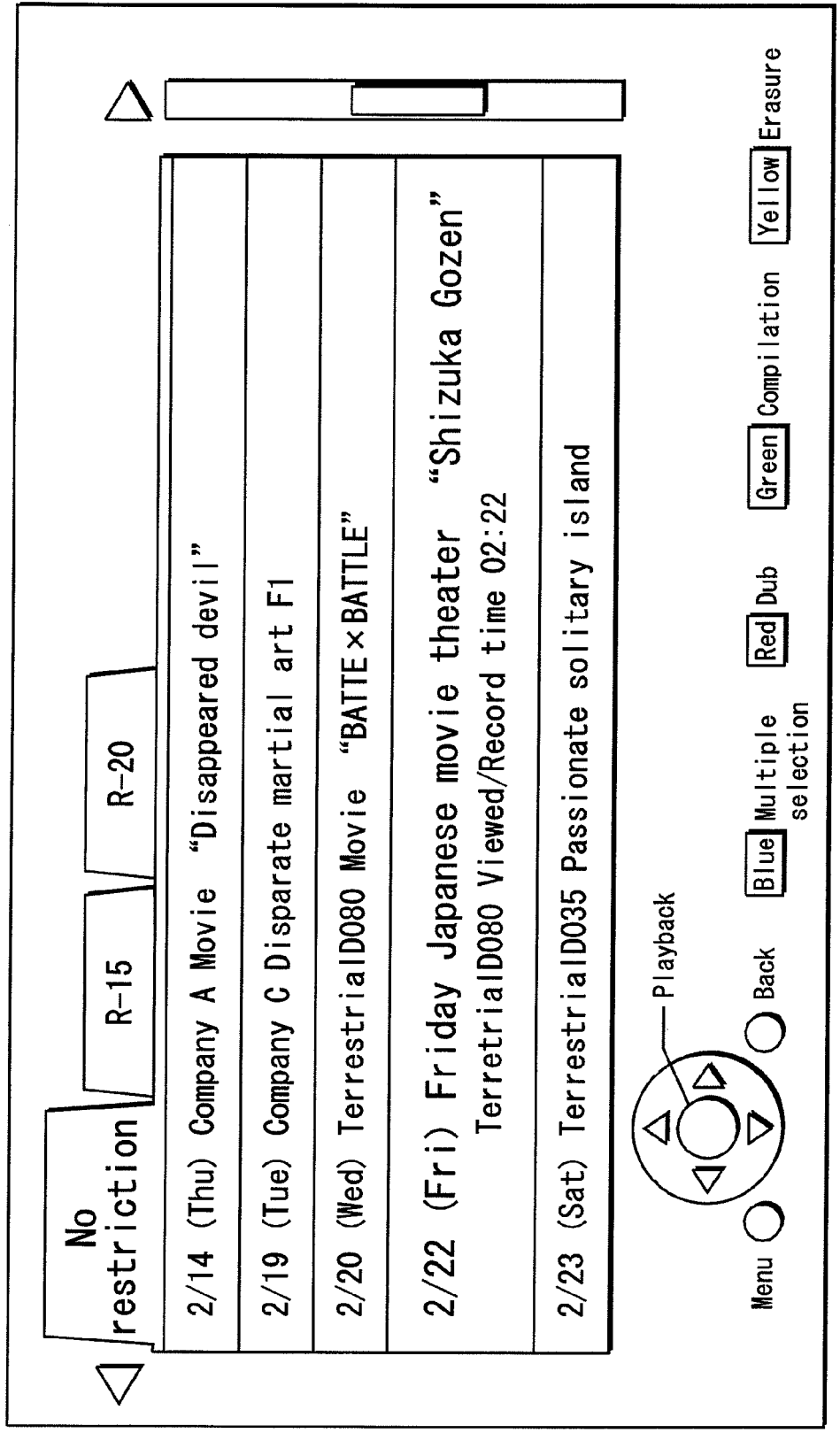
FIG. 12 is a screen view when a valid security code is input in FIG. 11.

When the input password is validated, the content playback apparatus 100 updates a display state to that shown in FIG. 12 based on information shown as "included in no restriction display" in the display method after removing a viewing restriction corresponding to "R-15" in the setting information 300.

As can be seen from FIG. 12, content titles specified as "R-15" are included in a content list indicated by a tab "no restriction".

Above are GUIs to be displayed and examples of display update thereof.

Embodiment 2

In the above-mentioned embodiment 1, the display program generation unit 107 generates a program to display a GUI by using information stored in the display program storage unit 110 and the program template storage unit 112, and the display program execution unit 105 executes the program.

However, the program may not have to be generated as it is generated in embodiment 1.

In other words, instead of being generated, the program to display a GUI may be preliminarily stored.

FIG. 19 is a block diagram showing a functional configuration of a content playback apparatus 200 in embodiment 2.

As shown in FIG. 19, the content playback apparatus 200 is composed of the display content selection unit 101, the removal password input unit 102, the network transmission/reception unit 103, the viewing restriction state management unit 104, the display program execution unit 105, the content display unit 106, the content information reception unit 108, the setting information storage unit 109, the display program storage unit 110, and the content storage unit 111.

Here, only differences from embodiment 1 are described.

As can be seen from a comparison of FIG. 2 and FIG. 19, embodiment 2 differs from embodiment 1 in that the display program generation unit 107 and the program template storage unit 112 are not included.

And, the program to display a GUI, which is generated by the display program generation unit 107 in embodiment 1, is preliminarily stored in the display program storage unit 110.

When the display program execution unit 105 is instructed to display the GUI, it executes the display program stored in the display program storage unit 110, and causes the content display unit 106 to display the GUI.

By doing this, as time to generate the program to display the GUI can be eliminated, time until the GUI is initially displayed can be reduced compared with embodiment 1.

Here, the GUI to be displayed is approximately the same as that shown in embodiment 1, so explanations thereabout are omitted.

Embodiment 3

The following describes a display method of a GUI and operation of the content playback apparatus which are different from those in embodiment 1. Since a configuration of the content playback apparatus and basic operation thereof are the same as those shown in embodiment 1, explanations about common characteristics are omitted.

<Configuration>

Figure 20:
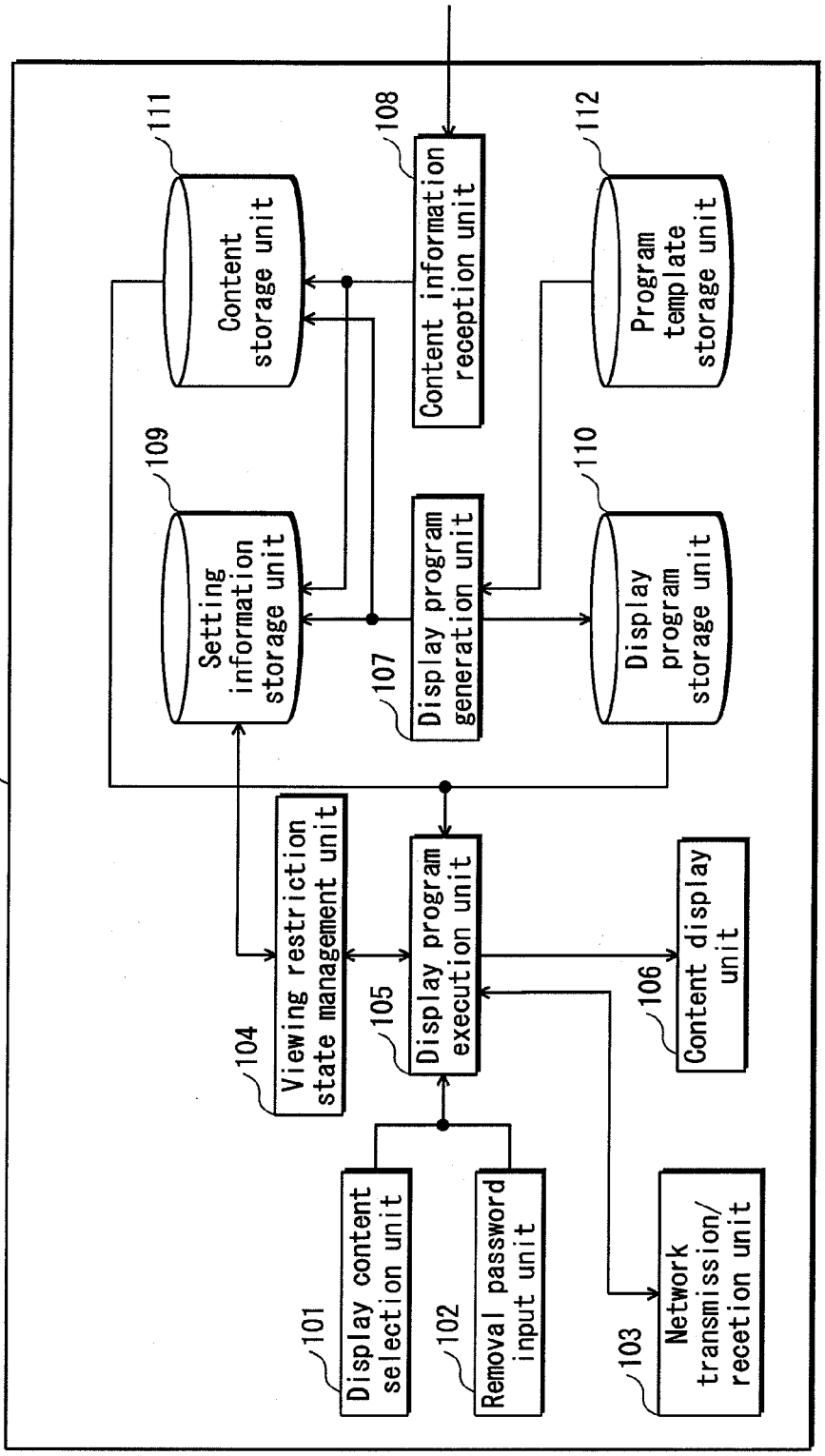
FIG. 20 is a block diagram showing a functional configuration of a content playback apparatus 300 in embodiment 3.

FIG. 20 is a block diagram showing a functional configuration of a content playback apparatus 300 in embodiment 3. As can be seen from a comparison of FIG. 20 and FIG. 2, the content playback apparatus 300 and the content playback apparatus 100 show no difference in a functional configuration.

Embodiment 3 differs from embodiment 1 in a method that allows the viewing restriction state management unit 104 to remove a viewing restriction and a template program stored in the program template storage unit 112.

Figure 24:
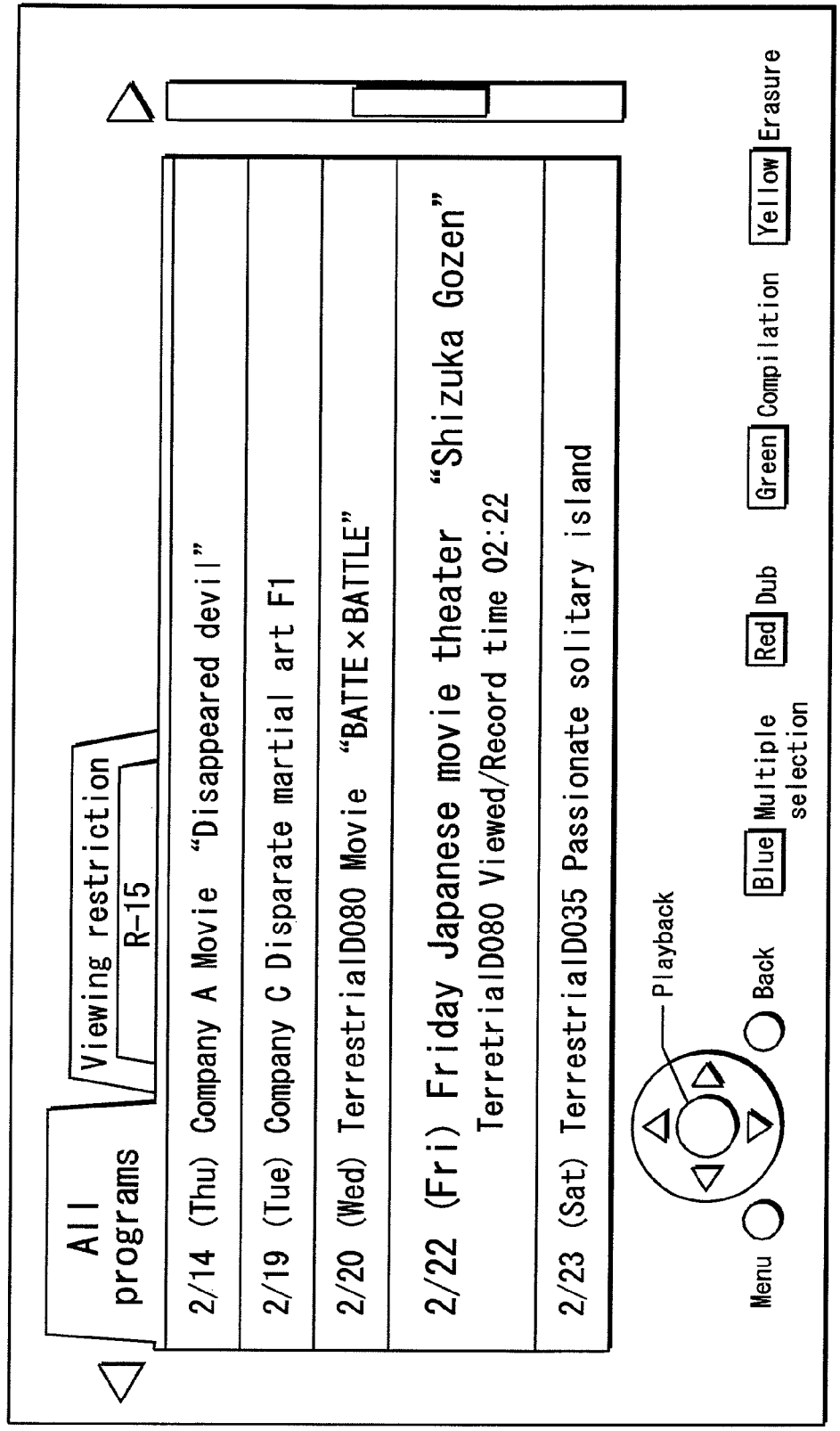
FIG. 24 is a display example of GUI displayed on the digital television 150 and a screen view when the GUI is displayed first in embodiment 3.

The template program is a program in which there is no information of content titles on a content list in FIG. 24. Unlike the template program shown in embodiment 1, a tab of "all programs" is included instead of a tab of "no restriction". For a content on which a viewing restriction is put, a tab corresponding to each viewing restriction will be generated in a tab of "viewing restriction". Although the tab of "all programs" is not described in the setting information 2100 shown in FIG. 21, information thereof is preliminarily incorporated in template data as a tab corresponding to a tab of "no restriction" shown in embodiment 1.

The viewing restriction state management unit 104 has a function, in addition to a function shown in embodiment 1, to remove, by referring to the setting information 2100 when removing a viewing restriction, viewing restrictions of all types which have a lower viewing restriction level than the viewing restriction level of the restriction information type ID whose viewing restriction is removed.

<Data>

FIG. 21 shows the setting information 2100 in embodiment 3. The setting information 2100 is information including a restriction information type ID 2101, a viewing restriction type 2102, a viewing restriction removal timing 2103, a viewing restriction removal range 2104, a viewing restriction removal period 2105, a display method before removing a viewing restriction 2106, a display method after removing a viewing restriction 2107, a viewing restriction removal state 2108, and a viewing restriction level 2109, each of which is associated with each piece of restriction information. Although a configuration of the setting information 2100 is approximately the same as that of the setting information 300, the setting information 2100 differs from the setting information 300 in that it includes the viewing restriction level 2109.

The viewing restriction level 2109 is information numerically representing severity of the viewing restriction put on a content of each type. It is set such that the higher a numerical value, the severer viewing restriction is put thereon. It is set to remove, when the higher level of viewing restriction is removed, a viewing restriction whose level is lower than the higher level.

"At the time of playback start" shown in the viewing restriction removal timing 2103 indicates that a GUI requesting removing of a restriction is displayed at a timing when a content of each type is played back. And "at the time of menu item selection" indicates that the GUI requesting removing of a restriction is displayed at a timing when a menu item to remove the viewing restriction is selected.

Also, "program name display and included in all programs" in the display method before removing a viewing restriction 2106 indicates that a program name is displayed and the program name is displayed in a tab of "all programs". And "program name non display and not included in all programs" in the display method before removing a viewing restriction 2106 indicates that a program name is not displayed and the program name is not displayed in a tab of "all programs".

Further also, "included in all programs" in the display method after removing a viewing restriction 2107 indicates that a program title is displayed in a tab of "all programs"

<Operation>

Figure 22:
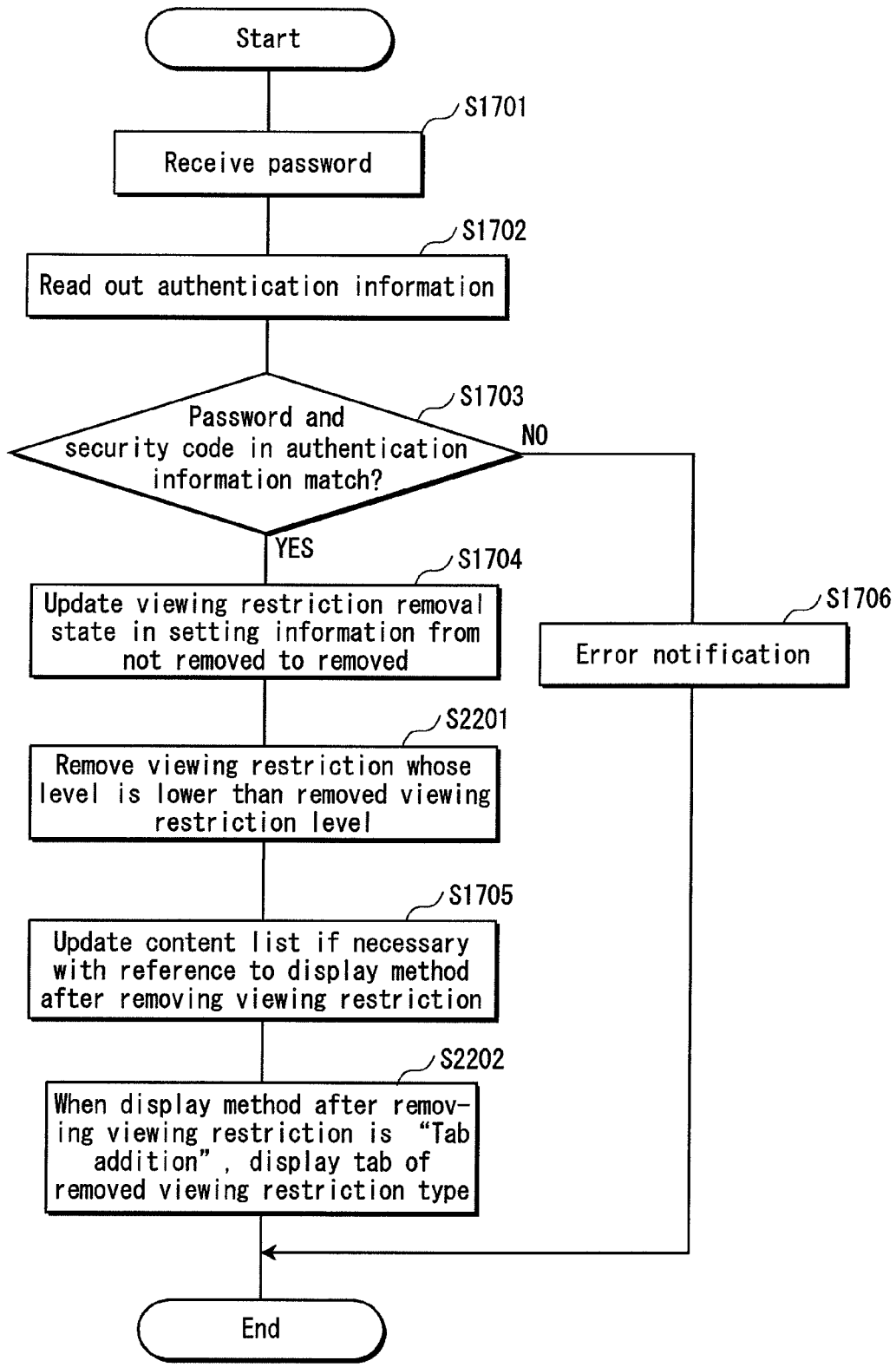
FIG. 22 is a flow chart showing details of operation pertaining to authentication performed by the content playback apparatus 300 in embodiment 3.

FIG. 22 is a flow chart showing operation of the content playback apparatus 300 in embodiment 3.

In embodiment 3, operation of the viewing restriction state management unit 104 differs from that shown in embodiment 1. More specifically, it differs in operation performed after step S1704 in the authentication shown in FIG. 17. Explanations about the other operation are omitted, because it differs only in that a tub of "no restriction" is replaced by a tab of "all programs".

When updating a viewing restriction removal state from "not removed" to "removed" (step S1704), the viewing restriction state management unit 104 obtains a viewing restriction level corresponding to a restriction information type ID whose viewing restriction is removed from the setting information 2100. And, as for the restriction information type corresponding to the viewing restriction level which is lower than the obtained viewing restriction level, if a viewing restriction removal state corresponding to the restriction information type is "not removed" the viewing restriction state management unit 104 updates the viewing restriction removal state to "removed" (step S2201).

The content playback apparatus 300 updates a content list by referring to a display method after removing a viewing restriction in the setting information 2100 (step S1705), and when "tab addition" is specified, it adds a tab showing a corresponding restriction level (step S2202).

By going through the step, when the higher level of a viewing restriction is removed, the content playback apparatus 300 removes a viewing restriction put on a content which is provided with a viewing restriction level lower than a viewing restriction level of a content whose viewing restriction is removed. This prevents a user from inputting a password many times.

<Content Playback Processing>

The following describes playback of a content.

Figure 23:
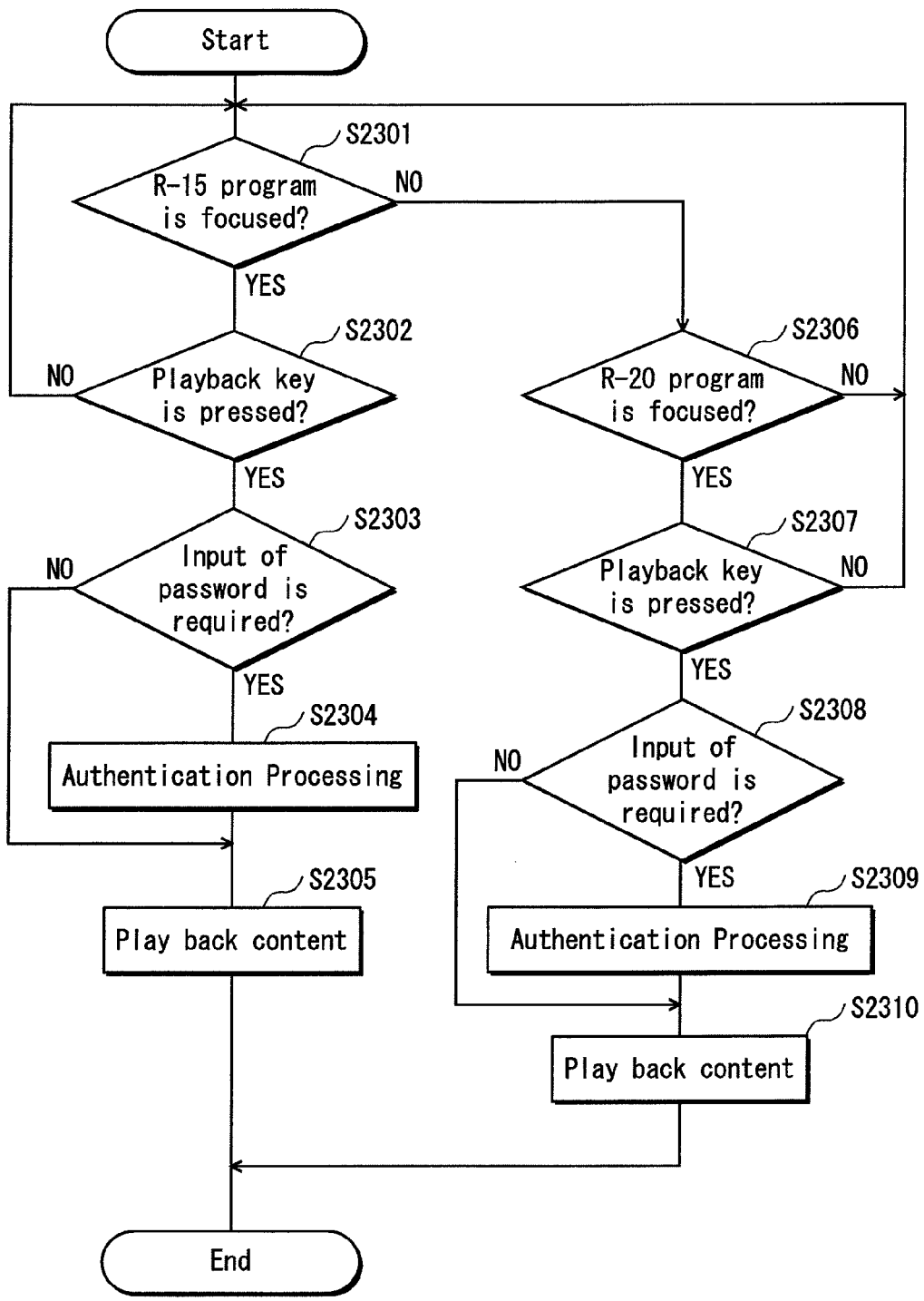
FIG. 23 is a flow chart showing operation pertaining to playback of a content performed by the content playback apparatus in embodiment 3.

FIG. 23 is a flow chart showing operation of the content playback apparatus 300 when playing back a content.

The display program execution unit 105 judges, from the restriction information type ID of a content to be focused, whether or not a content title to be focused, that is, to be targeted for selection of a cursor is a R-15 program (step S2301).

When receiving information showing pressing of a playback key from the display content selection unit 101 in a state where the R-15 program is focused (YES in step S2302), the display program execution unit 105 judges whether or not input of a security code is required from the viewing restriction state 2108 in the setting information 2100 (step S2303).

When the input of the security code is required (YES in step S2303), the above-mentioned authentication processing is performed (step S2304), and a content is played back (step S2305) when the security code is validated. When the input of the security code is not required, that is, when a restriction has been already removed (NO in step S2303), processing of step S2305 is performed.

On the other hand, when a R-15 program is not focused (NO in step S2301), whether or not a R-20 program is focused is judged (step S2306).

When receiving information showing pressing of a playback key from the display content selection unit 101 (YES in step S2307) in a state where the R-20 program is focused (YES in step S2306), the display program execution unit 105 judges whether or not input of a security code is required from the viewing restriction state 2108 in the setting information 2100 (step S2308).

When the input of the security code is required (YES in step S2308), the above-mentioned authentication processing is performed (step S2309), and a content is played back (step S2310) when the security code is validated. When the input of the security code is not required, that is, when a restriction has been already removed (NO in step S2308), processing of step S2310 is performed.

When both the R-15 program and the R-20 program are not focused (NO in step S2306), the playback key is not pressed (NO in step S2302, NO in step S2307), processing goes back to step S2301.

Also, when playing back a content on which a restriction is not put, the content is played back immediately after the playback key is pressed without performing these processing.

As shown in the above-mentioned step S2303 and step S2308, when playing back a content on which a viewing restriction is put, the authentication processing can be skipped if operation to remove a restriction shown in FIG. 17 has already performed. This can eliminate the bother of user operation.

<Example of Display Update>

The following describes an example of display update in embodiment 3. Programs conform to those shown in embodiment 1.

FIG. 24 shows a display state when the content playback apparatus 300 is powered on. As shown in the setting information 2100, titles of "R-15" programs (e.g. disparate martial art F1) are displayed in a tab of "all programs".

Figure 25:
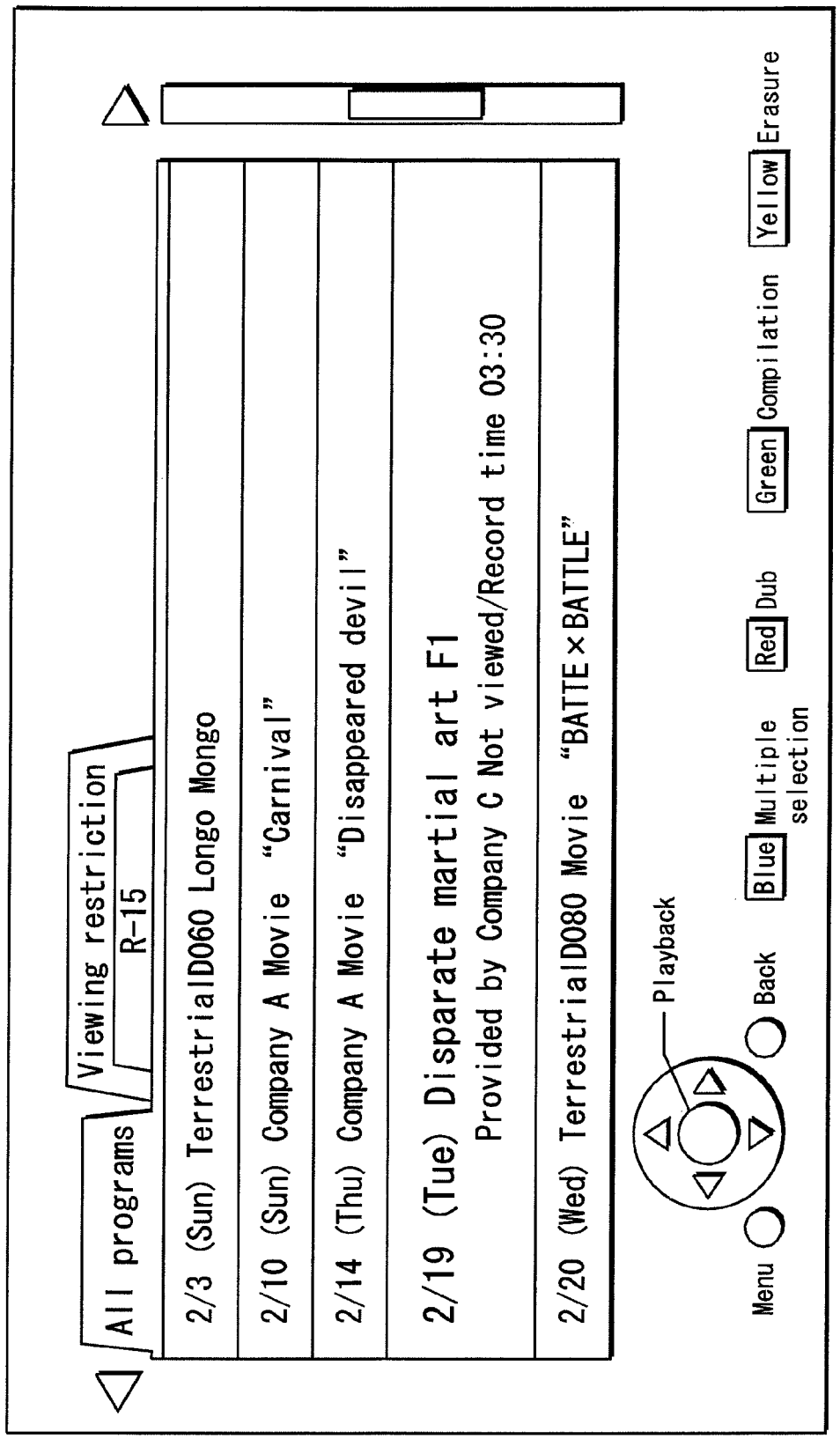
FIG. 25 is a screen view when a tab "R-15" in a tab "viewing restriction" is selected while a screen view shown in FIG. 24 is displayed.

FIG. 25 shows a display example when a tab "R-15" in a tab of "viewing restriction" is selected by tab switching. And here programs are the same as those shown in FIG. 10 in embodiment 1.

Figure 26:
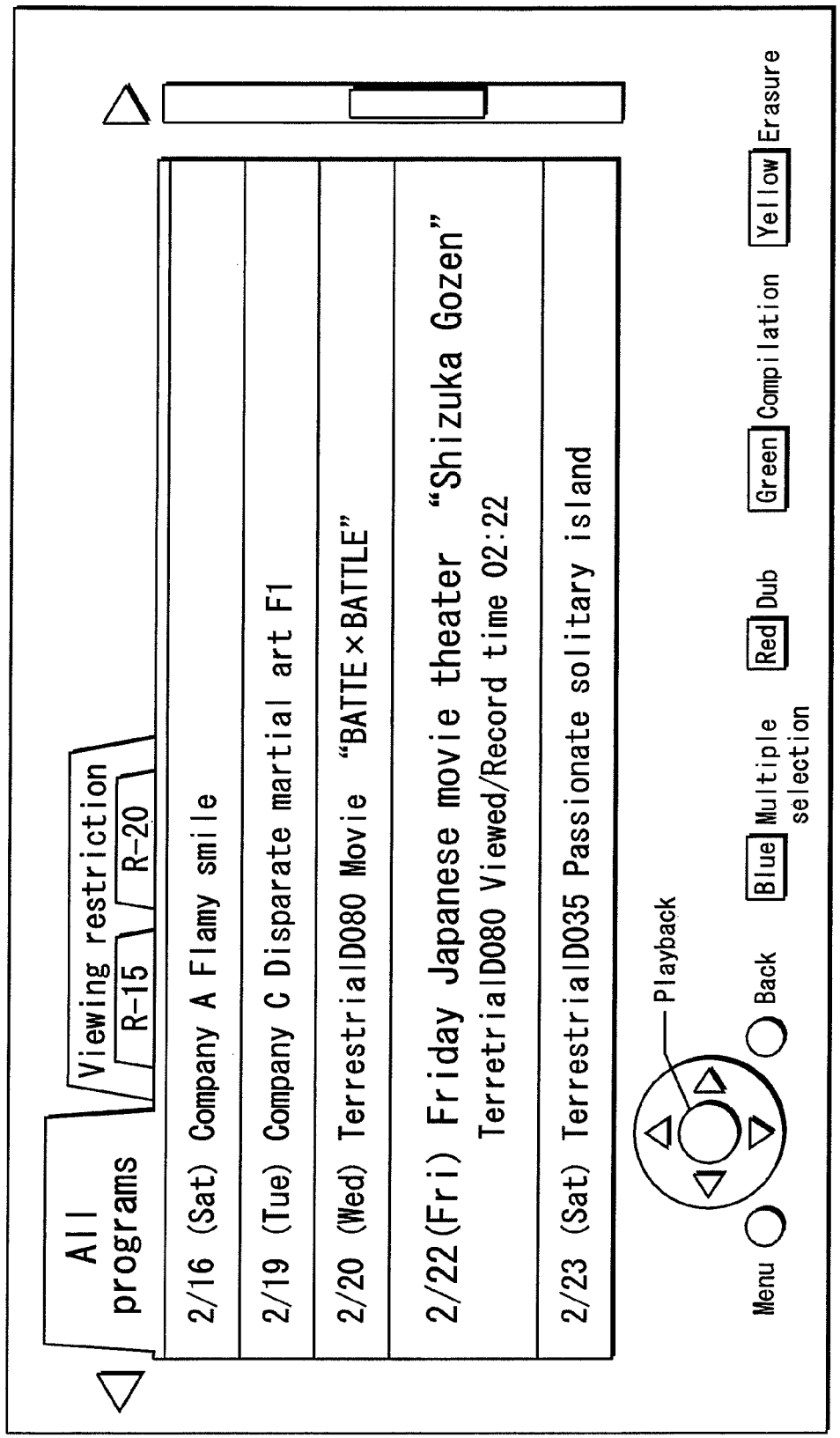
FIG. 26 is a screen view when a viewing restriction specified as "R-20" is removed while a screen view shown in FIG. 24 is displayed.

FIG. 26 is a screen view when a menu to remove a viewing restriction is selected as shown in FIG. 7 and FIG. 8 while a screen view shown in FIG. 24 is displayed, and a restriction of "R-20" is removed by being input a password.

FIG. 26 is a screen view when a restriction of "R-20" is removed; and a tab of "all programs" is selected.

As can be seen from transition from FIG. 24 to FIG. 26, a tab of "R-20" newly appears in the tab of "all programs". "A film "flamy smile"" classified as a program of "R-20" is included in "all programs" in accordance with the display method after removing a viewing restriction 2107 in the setting information 2100. Also, since a viewing restriction of "R-20" is removed, a viewing restriction of "R-15" whose viewing restriction level is lower than that of the viewing restriction of "R-20" will be removed.

Embodiment 4

In the above-mentioned embodiment 1, a case where the common setting information is used even if there is a plurality of services providing download services when downloading a content is described. However, in embodiment 4, a case where setting information of each service is stored will be described.

Figure 27:
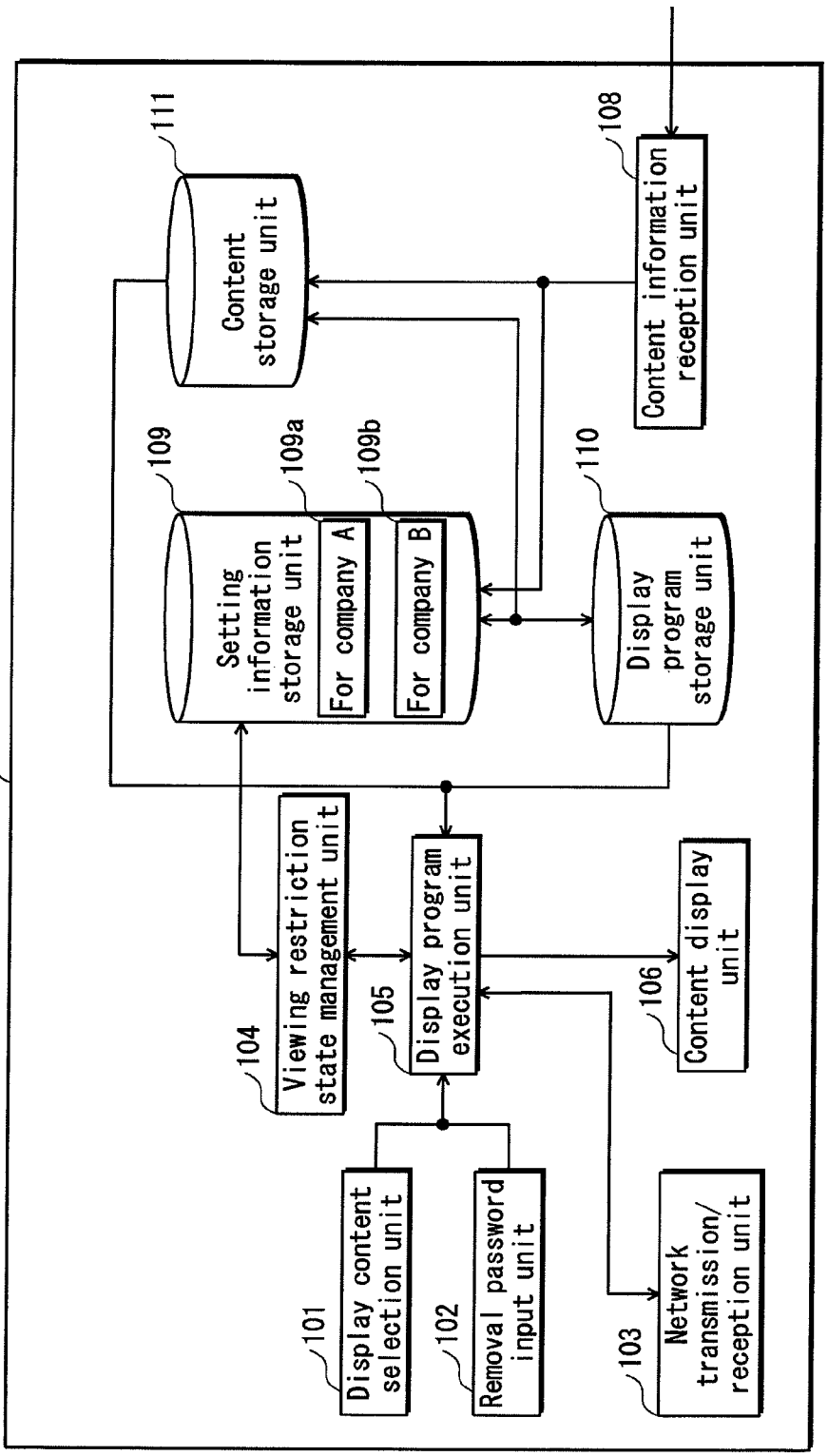
FIG. 27 is a block diagram showing a functional configuration of a content playback apparatus in embodiment 4.

FIG. 27 is a block diagram showing a functional configuration of a content playback apparatus 400 in embodiment 4. Since a functional configuration of the content playback apparatus in embodiment 4 is approximately the same as that shown in embodiment 2, detailed explanation of each unit is omitted here and a configuration and operation which is unique to embodiment 4 are described.

A difference therebetween is that the setting information storage unit 109 stores two types of information "for company A" (109a) and "for company B" (109b).

The display program storage unit 110 stores a program to display a GUI corresponding to each service. That is, setting information, which is shown in embodiment 1, corresponding to each service is simply stored, and each content of each service is displayed in accordance with setting information set by each service.

Also, the display program execution unit 105 generates a GUI to be displayed by referring to all pieces of setting information stored in the setting information storage unit 109, and causes the content display unit 106 to display the GUI. And content titles to be displayed are classified into each service by referring to the distribution source in the content storage unit 111.

<Data>

The following describes setting information for company A 109a and setting information for company B 109b.

FIG. 28 shows an example of a data configuration of setting information for company A 109a, and the configuration thereof is approximately the same as that shown in embodiment 1 and they correspond with each other.

On the other hand, FIG. 29 shows an example of a data configuration of setting information for company B 109b, and it is different from setting information shown in FIG. 3 and FIG. 28. In FIG. 28, although a restriction type is specified as "R-15" and "R-20", in the setting information for company B 109b, it is specified as "ages 15 and older" and "ages 18 and older" as shown in FIG. 29. Although not shown in FIG. 28 and FIG. 29, setting information is stored by being associated with version information showing a date and time of last updating. Meanwhile, "ages 15 and older" indicates that a user equal to or over the age of 15 can view a content which belongs to the type, and "ages 18 and older" indicates that a user equal to or over the age of 18 can view a content which belongs to the type.

As seen from the above, a restriction type and a way to restrict may differ depending on a service.

<Operation>

The following describes operation of the content playback apparatus in embodiment 4.

The content playback apparatus in embodiment 4 has setting information corresponding to a plurality of services, and periodically updates the setting information. The following describes the update operation.

Figure 30:
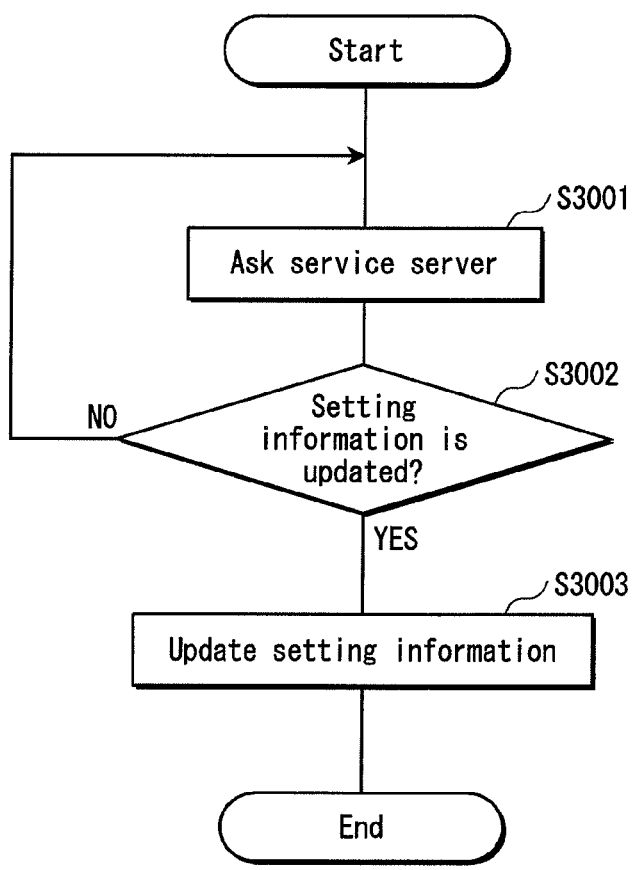
FIG. 30 is a flow chart showing operation of the content playback apparatus in embodiment 4.

FIG. 30 is a flow chart showing the operation.

As shown in FIG. 30, the content playback apparatus regularly accesses a service server, and asks for the setting information (step S3001). To access regularly indicates that, for example, the playback apparatus accesses the server once every other week, once every other mouth, and the like. And a cycle of the access may be arbitrarily set by a user of the content playback apparatus or defined by a service side. Also, the cycle may vary depending on a service.

The setting information stored in the service server includes version information. The version information is information showing a last date and time the information was updated. The content playback apparatus compares the version information included in the setting information stored in the content playback apparatus itself with the version information included in the setting information stored in the service server, and judges whether or not the setting information stored in the service server is newer than that stored in the apparatus itself (step S3002).

When it does not updates the setting information (NO in step S3002), processing is finished.

On the contrary, when it updates the setting information (YES in step S3002), the content playback apparatus obtains new setting information from the service server, and replaces the setting information with the obtained setting information (step S3003).

The processing is performed in terms of each service.

Figure 31:
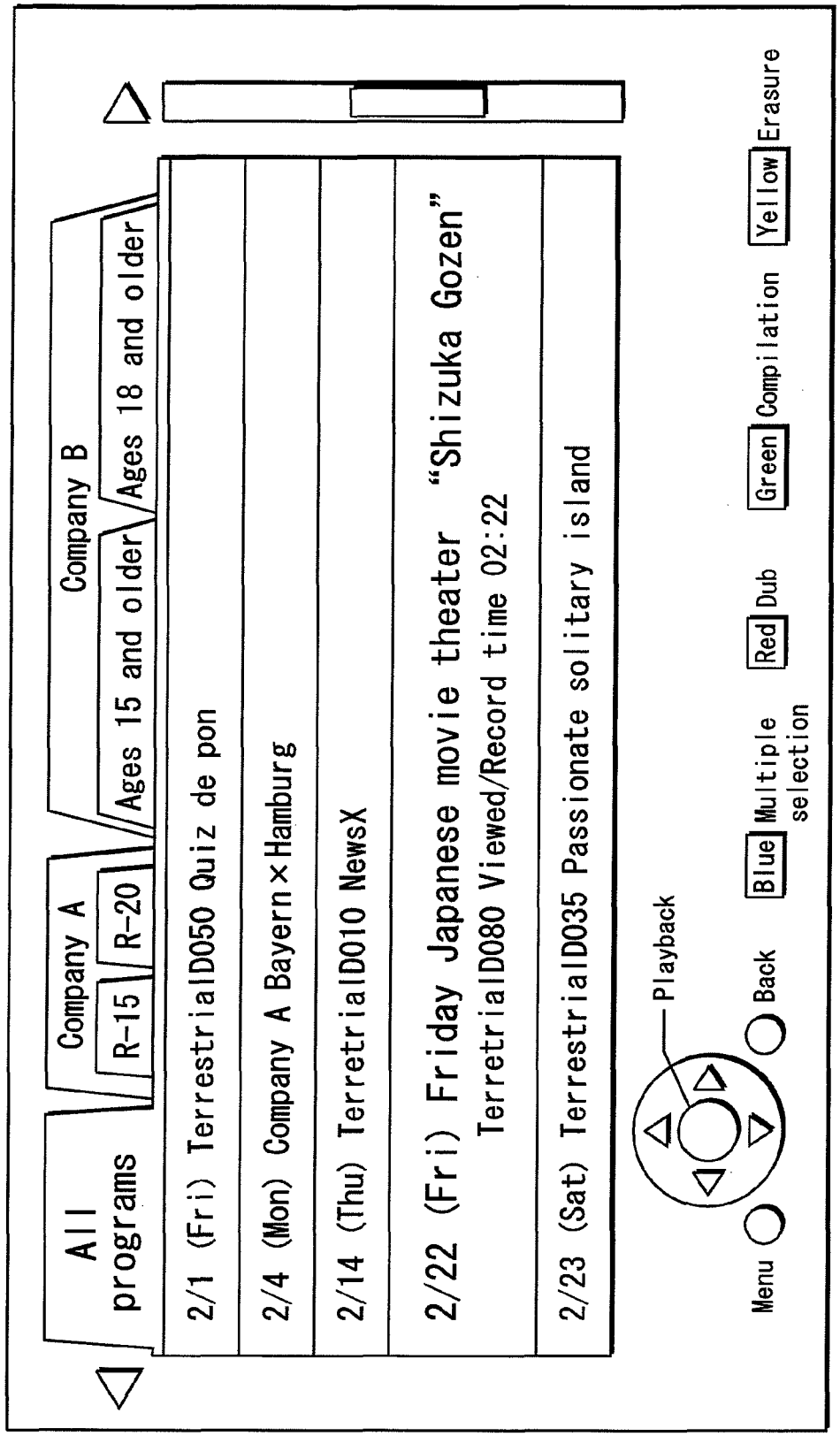
FIG. 31 is an example of a screen view when the content playback apparatus in embodiment 4 displays the GUI.

Meanwhile, a display method of a GUI does not differ from that in embodiment 1 except that a tab corresponding to each service is displayed as shown in FIG. 31. Also, a restriction removal method does not differ from that in embodiment 1 except that a restriction corresponding to each service is removed.

Embodiment 5

The following describes how to operate the content playback apparatus without using the remote control 160 and a control panel provided to the content playback apparatus as embodiment 5.

Figure 32:
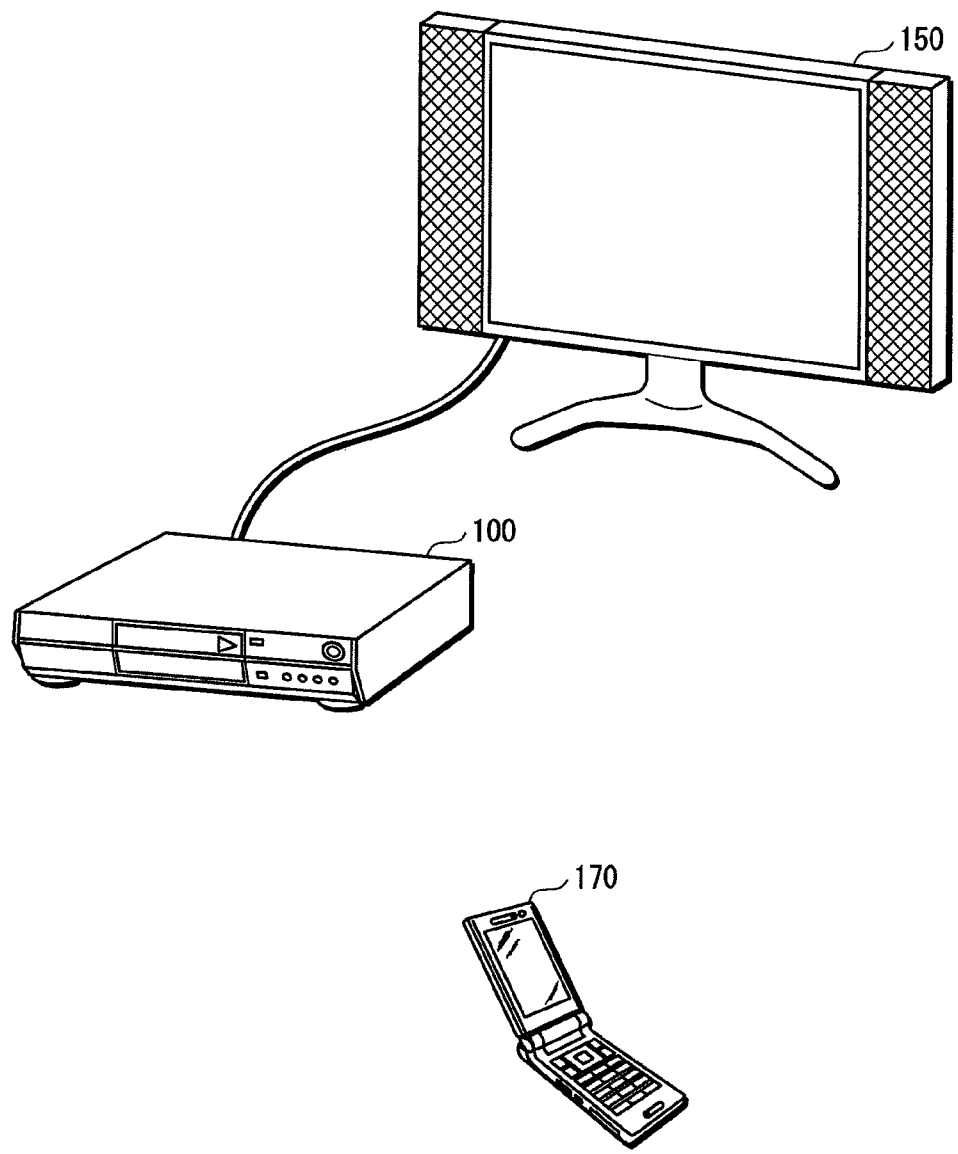
FIG. 32 shows another usage of a content playback apparatus 500.

FIG. 32 shows a usage of a content playback apparatus 500 in embodiment 5. The content playback apparatus 500 is connected to the digital television 150, and receives operation from a mobile phone 170 and executes control in accordance with the received operation.

Figure 34:
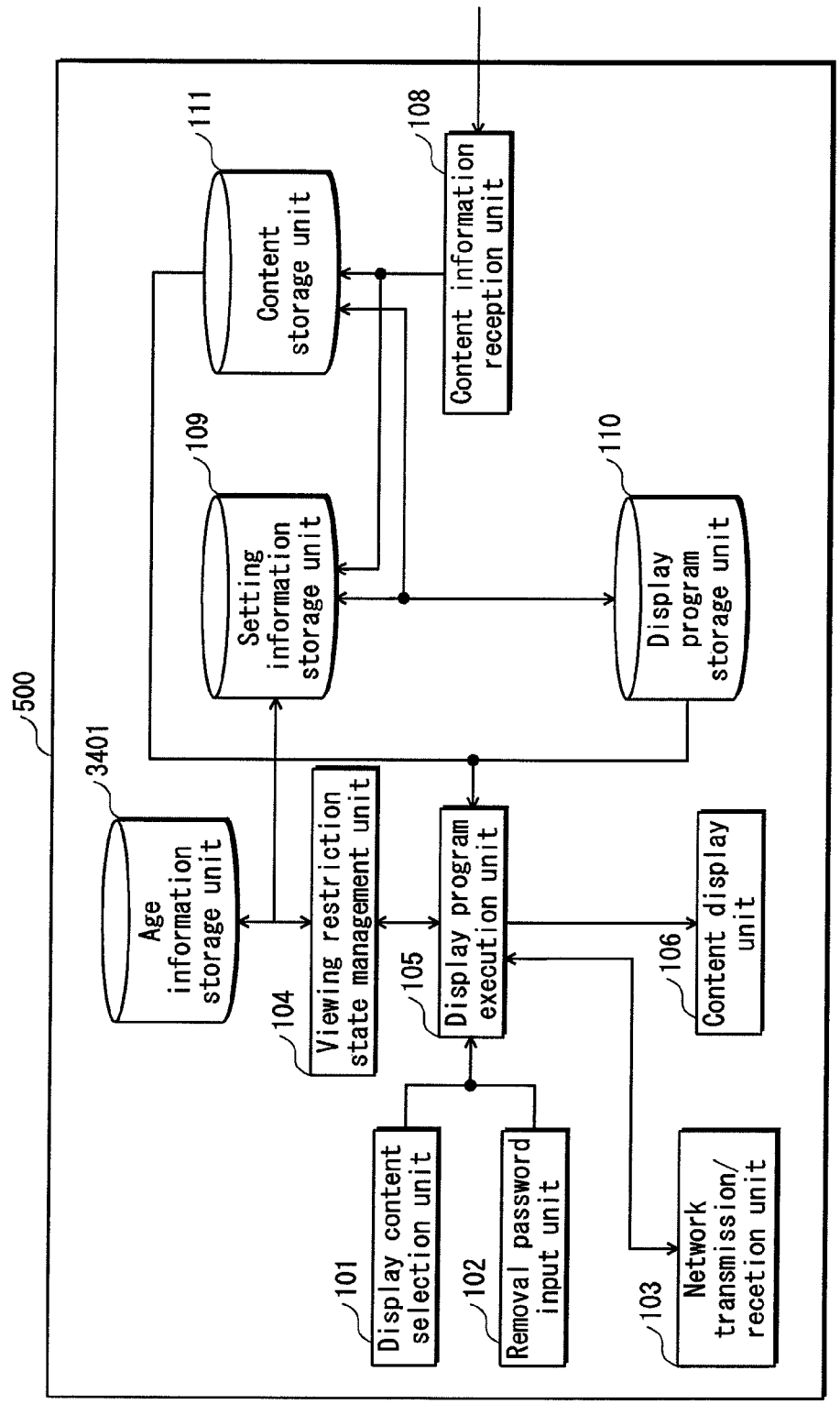
FIG. 34 is a block diagram showing a functional configuration of the content playback apparatus 500.

FIG. 34 is a block diagram showing a functional configuration of the content playback apparatus 500 in embodiment 5.

As shown in FIG. 34, the content playback apparatus 500 is composed of the display content selection unit 101, the removal password input unit 102, the network transmission/reception unit 103, the viewing restriction state management unit 104, the display program execution unit 105, the content display unit 106, the content information reception unit 108, the setting information storage unit 109, the display program storage unit 110, the content storage unit 111 and an age information storage unit 3401. A configuration thereof is approximately the same as that of the content playback apparatus 200 shown in embodiment 2, and the content playback apparatus 500 differs from the content playback apparatus 200 in that it includes the age information storage unit 3401.

Meanwhile, explanations about functional units which have the same names as those in embodiment 1 and embodiment 2 are omitted here.

In the age information storage unit 3401, information corresponding to an age of a user who uses the content playback apparatus 500 is set. In other words, an age of a user whose age is the lowest among ages of users who use the content playback apparatus 500 is set. The age information is set by a user, and it is often used in the authentication processing to remove a restriction which is put on a content to be played back.

Figure 35:
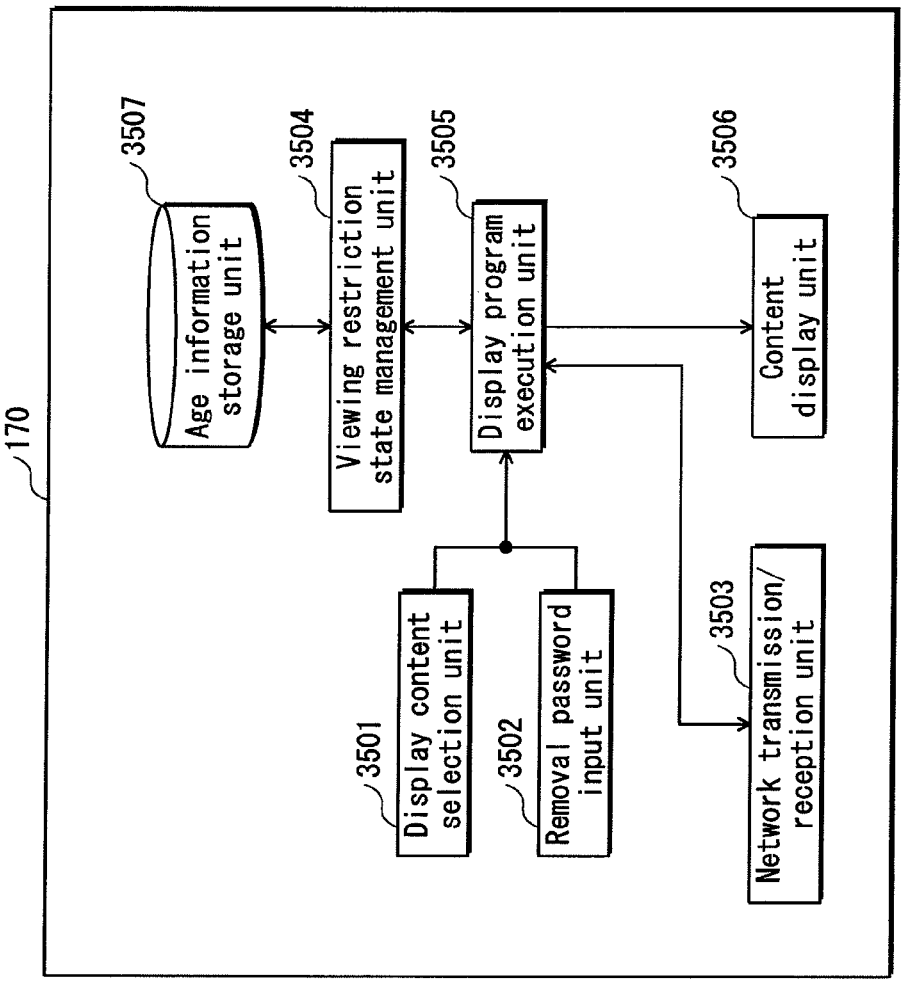
FIG. 35 is a block diagram showing a functional configuration of the mobile phone 170.

FIG. 35 is a block diagram showing a functional configuration of the mobile phone 170. As shown in FIG. 35, the mobile phone 170 is composed of a display content selection unit 3501, a removal password input unit 3502, a network transmission/reception unit 3503, a viewing restriction state management unit 3504, a display program execution unit 3505, a content display unit 3506, and an age information storage unit 3507. In this functional block diagram, only functional units which are required in embodiment 5 are described, and a verbal communication function, an e-mail function, and the like which are normally held by a mobile phone are not described.

Each functional unit of the mobile phone 170 has the same name as that of each functional unit of the content playback apparatus 500, and a function of each functional unit is approximately the same as that of the content playback apparatus 500. Here differences therebetween are described.

The network transmission/reception unit 3503 has a function to communicate with the content playback apparatus 500 and obtain a display program which is held by the display program storage unit 110 in the content playback apparatus 500.

The display program execution unit 3505 has a function to execute the display program obtained by the network transmission/reception unit 3503 and cause the content display unit 3506 to display the GUI shown in embodiment 1 and so on.

The age information storage unit 3507 has a function to hold information pertaining to an age of a user of the mobile phone 170. The information may be information showing the age of the user itself, for example, "22 years old" or may be information showing a birth date of the user. When the information is information showing the birth date of the user, the user's age can be calculated by subtracting the birth date from date and time information of the mobile phone 170.

<Operation>

The following describes operation of the mobile phone 170 and the content playback apparatus 500 when displaying a GUI.

A user of the mobile phone 170 accesses URL of a GUI program managed by the network transmission/reception unit 103 by using a web access function of the mobile phone 170. At that time, the network transmission/reception unit 103 asks the user for input of a password through the mobile phone 170 to judge whether or not the user of the mobile phone 170 has a legitimate right to operate the content playback apparatus 500.

The user inputs the password through the mobile phone 170, and information about the password is transmitted to the content playback apparatus 500 through the internet by SSL (Secure Socket Layer) communication.

The network transmission/reception unit 103 judges whether or not the received password is valid. When judging that it is valid, the network transmission/reception unit 103 receives, from the display program execution unit 105a, a GUI program becoming, for example, Java™ script.

The display program execution unit 3505 in the mobile phone 170 executes the received GUI program, and transmits, to the content playback apparatus 500, information showing what kind of list is displayed and what type of content is displayed.

The content playback apparatus 500 transmits, to the mobile phone 170, information showing a content title which is required to be read from the content storage unit 111 and to which list the content title belongs based on the information received from the mobile phone 170.

Figure 33:
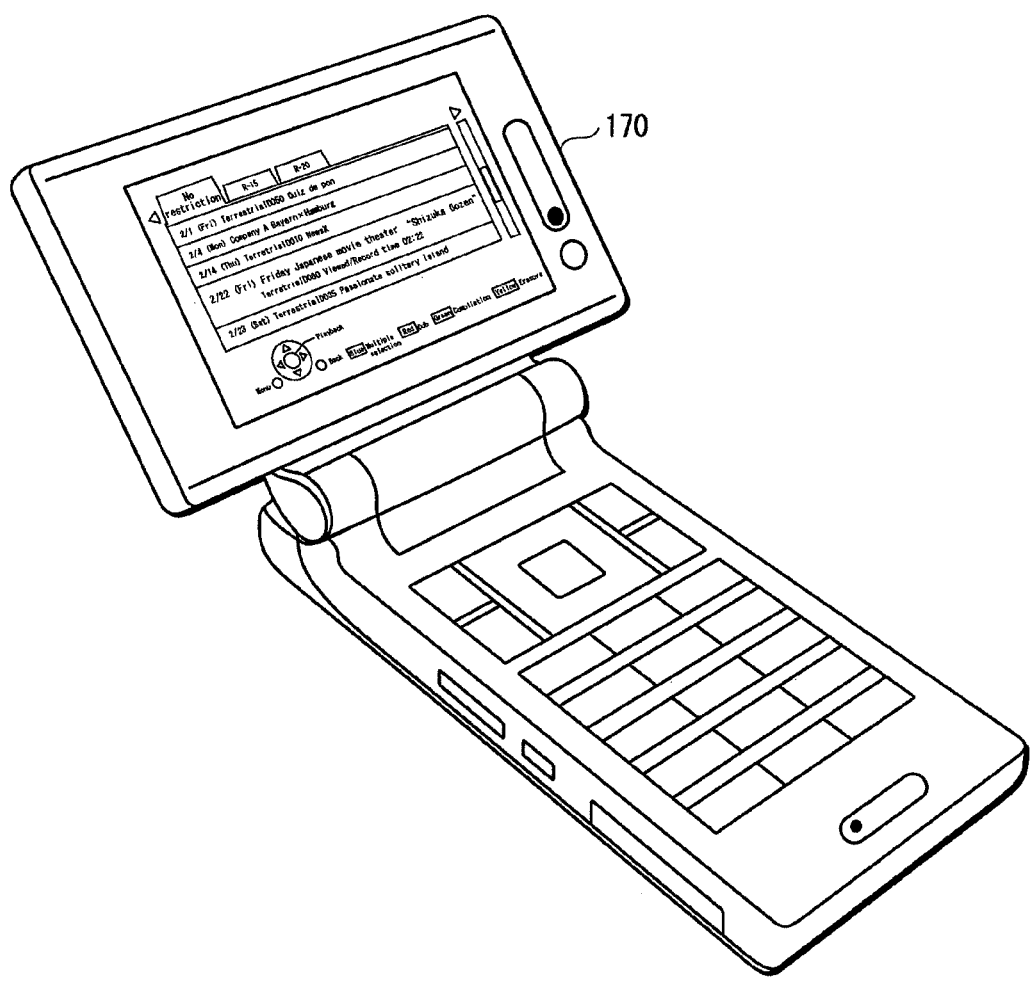
FIG. 33 is an appearance diagram of a mobile phone 170, and shows that GUI provided by the content playback apparatus 100 is displayed on its display screen.

As shown in FIG. 33, the GUI is displayed on a screen of the mobile phone 170. A command corresponding to the input operation issued to the GUI via the mobile phone 170 is transmitted to the content playback apparatus 500. The content playback apparatus 500 executes control in accordance with a received operation. For example, when playback is selected in the GUI displayed on a screen of the mobile phone 170, the mobile phone 170 transmits a command to play back and information showing the selected content to the content playback apparatus. The content playback apparatus 500 reads required content data from the content storage unit 1119, and streams the content data to the mobile phone 170. And the mobile phone 170 displays moving images based on the streamed content data.

The above-mentioned mechanism which is performed by a server to start and execute a program upon request from a client can be executed by, for example, a CGI (Common Gateway Interface) program.

The input of a password to access a web page, and perform authentication to remove a restriction put on a content to be played back may be performed based on specific information held by the mobile phone 170. That is, the content playback apparatus 500 preliminarily stores information for identifying an apparatus which can access a web page, for example, an equipment number of the mobile phone 170 and a restriction type ID whose restriction can be removed through an apparatus indicated by the equipment number. And the content playback apparatus 500 may ask the mobile phone 170 for the equipment number and perform authentication at a timing when starting communication.

Figure 36:
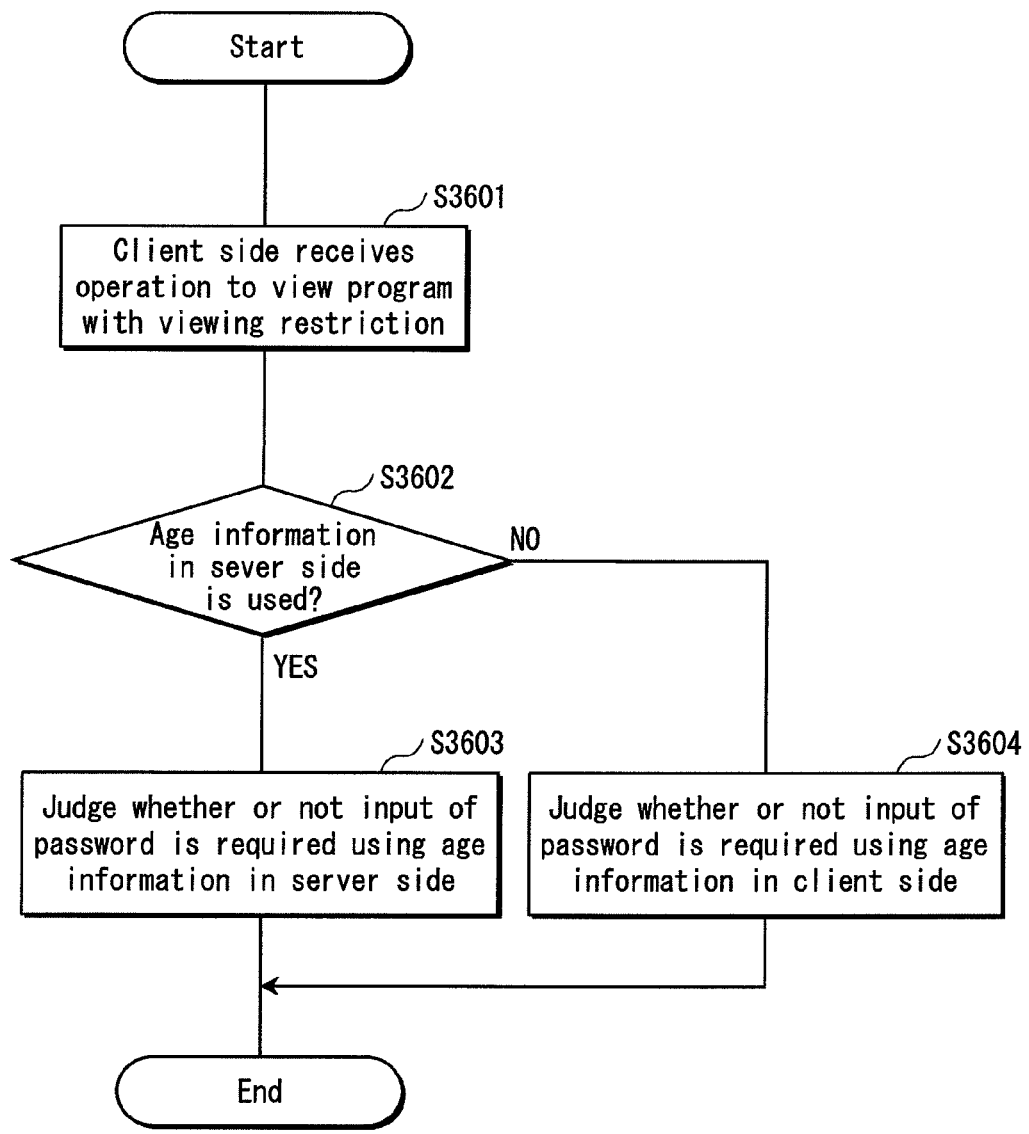
FIG. 36 is a flow chart showing operation of the content playback apparatus pertaining to restriction removal.

The following describes operation pertaining to selection of age information to be used in authentication processing shown in embodiment 5 with use of FIG. 36. FIG. 36 is a flow chart showing operation of the content playback apparatus pertaining to removal of a restriction.

The display program execution unit 105 in the content playback apparatus 500 receives, through the network transmission/reception unit 103, a command to play back a program on which a viewing restriction is put from the mobile phone 170 (step S3601).

The content playback apparatus 500 judges whether an age set in the server side, that is, in the age information storage unit 3401 in the content playback apparatus 500 is used for judgment or an age set in the client side, that is, in the age information storage unit 3507 in the mobile phone 170 is used for judgment in accordance with a predetermined condition which is preliminarily set (step S3602). The above-mentioned predetermined condition is described later.

When age information in the server side is used (YES in step S3602), the age information stored in the age information storage unit 3401 in the content playback apparatus 500 and an age indicated by restriction information having been attached to a content to be played back (e.g. 15 years old in the case of "R-15") are compared, and whether or not input of a security code is required is judged (step S3603).

When age information in the server side is not used (NO in step S3602), the age information stored in the age information storage unit 3507 in the mobile phone 170 and an age indicated by restriction information having been attached to a content to be played back (e.g. 15 years old in the case of "R-15") are compared, and whether or not input of a security code is required is judged (step S3604).

And when the input of the security code is required, a GUI requiring the security code is displayed. Meanwhile, in step S3603 and step S3604, if a viewing restriction put on a content selected to be played back has already been removed by referring to setting information, the content is played back without performing the judgment.

The following describes the above-mentioned predetermined condition.

The condition can be arbitrarily set by a user. The following conditions are set to the content playback apparatus 500 as the predetermined condition.

(Condition 1) When age information in a client side (the mobile phone 170 side) can be used, the age information in the client side is surely used.
(Condition 2) The lower age information between the age information set in the client side (the mobile phone 170 side) and the age information set in the server side (the content playback apparatus 500 side) is used.
(Condition 3) Depending on time information set in the client side, that is, a time when the content playback apparatus is used, whether the age information set in the server side (the content playback apparatus 500 side) is used or the age information set in the client side (the mobile phone 170 side) is used is switched. For example, the age information set in the client side (the mobile phone 170 side) is used during the night (22:00-06:00), and the age information set in the server side (the content playback apparatus 500 side) is used during the rest of the time.

To explain about the condition 1, the condition is used because a mobile phone is normally a user's personal belonging, and thereby an age of the user who intends to view content held by the mobile phone 170 is more accurate than an age of the user held by the content playback apparatus 500 in many cases. In doing so, an effort to input a security code and the like when the older user views a content stored in the content playback apparatus 500 by using the mobile phone 170 can be saved.

To explain about the condition 2, by putting a restriction using the younger value as a target for comparison, a viewing restriction can be put at a lowest line, that is, it can be put by using the strictest standard. Suppose that an age set in the age information storage unit 3401 in the content playback apparatus 500 is "12 years old", and an age set in the age information storage unit 3507 in the mobile phone 170 is "30 years old". When the condition 2 is used, even if a 12-year-old user tries to play back a content on which a viewing restriction is put by using the mobile phone 170, the user is requested for a security code. This specification is realized, in step S3602, by comparing age information held by the server side (the content playback apparatus 500 side) with age information held by the client side (the mobile phone 170 side), and using the lower age information to judge whether or not a GUI requesting the security code is displayed.

To explain about the condition 3, age information set in the client side which can specify a personal age is used because more contents for adults are broadcast and recorded during the night compared with those broadcast and recorded during the day.

Besides these, a condition in which age information set in the client side is used when the mobile phone is equipped with a GPS function and the mobile phone 170 is within a predetermined range (e.g. inside a house) may be used. Also, a condition in which age information to be used is decided depending on whether the number of terminals like the mobile phone 170 which access a server, that is the content playback apparatus, exceeds a predetermined number or not may be used.

<Modifications>

The present invention has been described based on, but is not limited to, the above embodiments. The following describes various modifications which have the same idea as shown in the present invention.

(1) In the above-mentioned embodiments, user input to operate the content playback apparatus 100 is received through the remote control 160 or the mobile phone 170, the input may be received through a control panel which is directly mounted on the content playback apparatus 100.

(2) Each storage unit in the above-mentioned embodiments (the setting information storage unit 109, the display program storage unit 110, the content storage unit 111, and the program template storage unit 112) may be a memory or a HDD which stores data different from data stored in the other storage units. Alternatively, a configuration in which an area for storing data each storage unit should store, is separately set within a storage area of one memory or one HDD may be employed.

Figure 37:
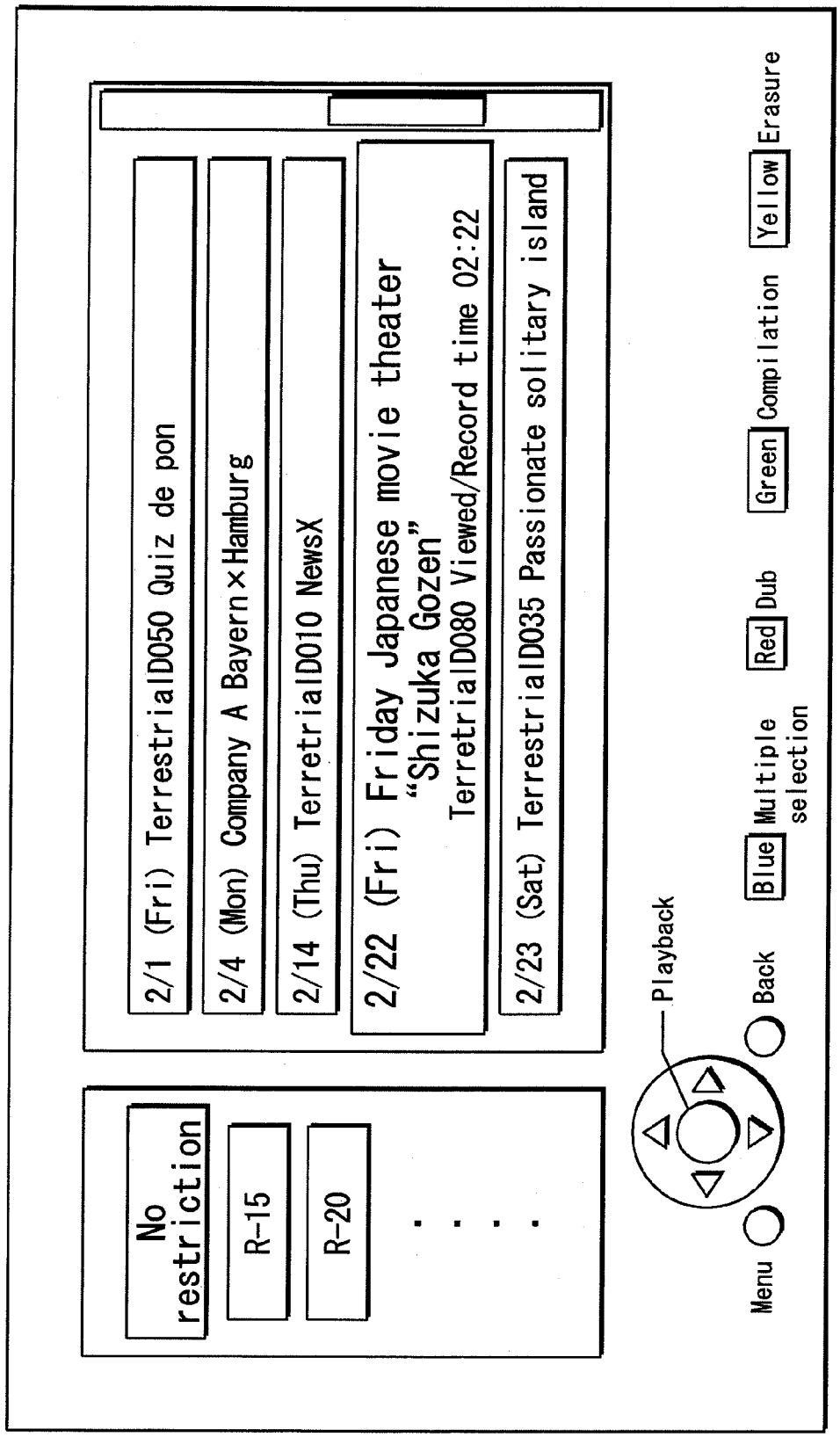
FIG. 37 is a screen view showing another display style of the GUI.
Figure 38:
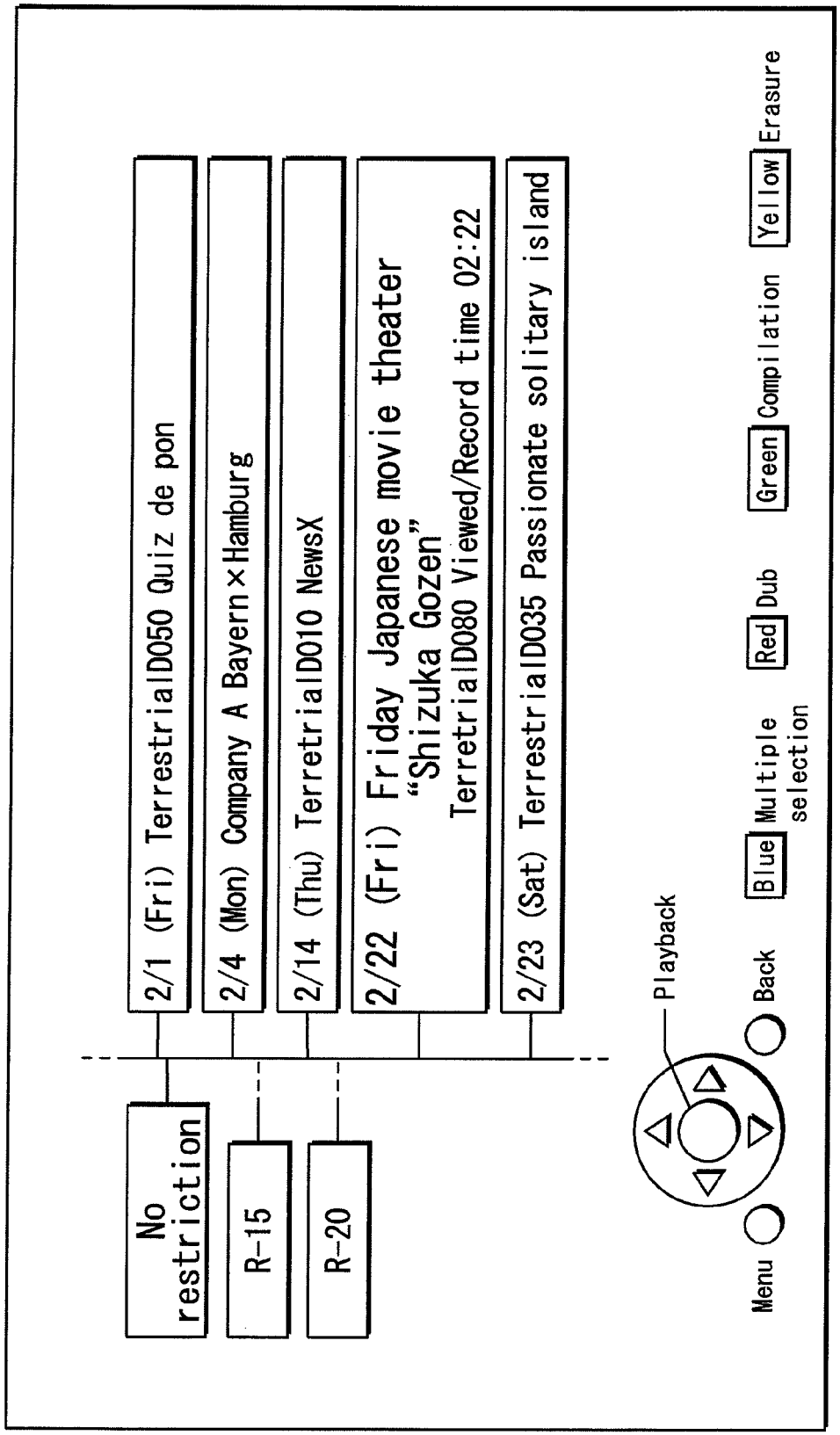
FIG. 38 is a screen view showing another display style of the GUI.

(3) In the above-mentioned embodiments, as shown in FIG. 9, a list of contents of each piece of restriction information is displayed in a tab form in a GUI to easily distinguish a content to which each piece of the restriction information has been attached. However, it is not necessarily displayed in the tab form as long as in a form with which a user can easily identify the content to which each piece of the restriction information has been attached. For example, as shown in FIG. 37, it may be displayed in a two-pane form, or, as shown in FIG. 38, it may be displayed in a tree structure form.

(4) A control method shown by the setting information 300 in the above-mentioned embodiments is one example. A control method which is different from that shown in FIG. 3 and FIG. 20 may be set, and the content playback apparatus 100 may perform control in accordance with the control method. For example, as for a display method after removing a viewing restriction, it is shown as "included in no restriction display" and "not included in no restriction display". However, for example, the setting information 300 may be set so as to perform control by which contents specified by "R-15" and "R-20" are included in a list specified as "age-restricted" by generating the list.

(5) In the above-mentioned embodiments, although a security code of each restriction information type is set, a security code which differs among contents may be used. In this case, the authentication information 510 is information it is configured by associating each content management ID with the security code.

Also, both a security code pertaining to display of content titles in a content list and a security code pertaining to playback of a content may be stored in the content playback apparatus 100 and each of them may be controlled. In other words, in addition to the authentication information 510 in the above-mentioned embodiments, the content playback apparatus may store authentication information for playback being information which is obtained by associating a security code with each content management ID.

(6) In the above-mentioned embodiments, setting information data is attached to an obtained content. However, it is considered that the setting information data is not attached to the content.

When the content playback apparatus 100 obtains restriction information of a new type which is not stored in the apparatus, that is, which is not registered in the setting information 300, it may access a server and the like which distribute contents through the Internet, obtain setting information data corresponding to the restriction information held by the server, add the obtained setting information data to the setting information 300, and updates the setting information 300.

(7) In the above-mentioned embodiments, only a selected content list is displayed, but all or a plurality of content lists may be displayed depending on a size of a screen.

(8) In the above-mentioned embodiment 4, setting information of each service is described to be held separately. However, these pieces of information may not be held separately but held as one list. In that case, in the setting information, another piece of information for specifying a service is associated (to explain this with use of FIG. 3, a column for specifying the service is added). And when updating the setting information, only a part corresponding to a service which corresponds to obtained piece of setting information in the setting information originally stored is updated with use of the setting information obtained from a service server.

(9) In the above-mentioned embodiment 5, a mobile phone is taken as an example of an apparatus which can operate the content playback apparatus 100 by accessing a web page managed by the content playback apparatus 100. However, it is not limited to the mobile phone, and it may be, for example, a digital television, a digital camera, a digital video camera, a car navigation system, a potable BD/DVD player, PDA (Personal Digital Assistants) all of which have a network communication function, or any equipment as long as it has a communication function enabling access to the internet.

Also, the above-mentioned content playback apparatus is implemented to a BD recorder, a BD player, a DVD recorder, a DVD player, a digital television, a car navigation system, and the like.

(10) In the above-mentioned embodiment 5, a user of the mobile phone 170 operates the content playback apparatus 500 by transmitting/receiving a command using HTTP. However if the mobile phone has an infrared communication function, the content playback apparatus 500 may be operated by using the function.

Further also, when using equipment without a display screen which the mobile phone has, or with a display screen which has not enough space to display a GUI, such equipment may be simply used as a remote control, and display may be checked on a digital television screen.

(11) In the above-mentioned embodiments, a GUI program is dynamically generated by the display program generation unit 107 each time the content playback apparatus 100 is turned on. However, the content playback apparatus 100 may not be equipped with the display program generation unit 107 and the program template storage unit 112, and the display program storage unit 110 may preliminarily stores a GUI program which is created so as to respond to a content on which whatever type of viewing restriction is put. That is to say, the display program storage unit 110 stores a GUI program in which tabs pertaining to all the viewing restrictions are prepared and a GUI is displayed by simply sorting identifying information of each content, that is, a title of each content.

(12) In the above-mentioned embodiments, a viewing restriction is removed in response to input of a password using the remote control 160, or input of a password which is performed through an external apparatus. However, it is considered to receive operation from a plurality of devices (e.g. the remote control 160 and the mobile phone 170) at the same time. Therefore, the viewing restriction state management unit 104 may manage a viewing restriction state of each apparatus.

(13) In the above-mentioned embodiment 5, a judgment about whether age information in a server side (the content playback apparatus 500 side) is used or that in a client side (the mobile terminal 170 side) is used is performed by the server side (the content playback apparatus 500 side).

However, the judgment may be performed by the client side (the mobile terminal 170 side). The following describes operation performed in this case.

The mobile terminal 170 receives, from a user, an instruction of playback of a content on which a viewing restriction is put. Then, the mobile terminal 170 judges whether or not a GUI requesting a security code is required to be displayed. When judging it, either one of conditions shown in embodiment 5 is used.

When the mobile terminal 170 judges that the GUI requesting the security code is required to be displayed, and when age information held by the content playback apparatus 500 is required to be used, the mobile terminal 170 transmits, to the content playback apparatus 500, a command requesting age information held by the age information storage unit 3401 in the content playback apparatus 500.

In response to the request, the content playback apparatus 500 transmits the age information to the mobile terminal 170, and the mobile terminal 170 receives the age information.

The mobile terminal 170 compares the age information received from the content playback apparatus 500 with an age restriction which is put on a content to be played back. When an age indicated by the age information is higher than an age indicated by the age restriction, the mobile terminal 170 requests the content playback apparatus 500 to transmit stream data of a selected content, and displays the content based on the stream data transmitted in response to the request. When an age indicated by the age information is lower than an age indicated by the age restriction, the mobile terminal 170 displays a GUI requesting a security code. When a valid security code is input, the mobile terminal 170 requests the content playback apparatus 500 to distribute the stream data, and when an invalid security code is input, it displays a message showing that the security code is invalid.

When the mobile terminal 170 judges that the GUI requesting the security code is required to be displayed, and when age information held by the mobile terminal 170 is used, the mobile terminal 170 reads out age information held by the age information storage unit 3507 in the terminal.

The mobile terminal 170 compares the read out age information with an age restriction which is put on a content to be played back. When an age indicated by the age information is higher than an age indicated by the age restriction, the mobile terminal 170 requests the content playback apparatus 500 to transmit stream data of a selected content, and displays the content based on the stream data transmitted in response to the request. When an age indicated by the age information is lower than an age indicated by the age restriction, the mobile terminal 170 displays a GUI requesting a security code. When a valid security code is input, the mobile terminal 170 requests the content playback apparatus 500 to distribute the stream data, and when an invalid security code is input, it displays a message showing that the security code is invalid.

Above is an explanation that the mobile terminal 170 performs operation shown in FIG. 36 in above-mentioned embodiment 5.

(14) Each functional unit in the above-mentioned embodiments may be realized in one or more LSI (Large Scale Integration), or functions which a plurality of functional units have may be realized in one LSI. The LSI is called as a VLSI (Very Large Scale Integration), an ultra LSI depending on a difference in integration degree.

(15) A control program composed of a program code to cause a processor of the content playback apparatus and various circuits connected to the processor to perform operation pertaining to display of a GUI shown in the above-mentioned embodiments, generation processing of the GUI (see FIG. 17) and the like may be recorded in a recording medium, or may be distributed via various communication channels. This kind of recording medium is represented by an IC card, a hard disc, an optical disc, a flexible disc, a ROM and the like. The distributed control program is used by being stored in a memory and the like which can be read to the processor. And by the processor performing the control program, various functions shown in embodiments are realized.

INDUSTRIAL APPLICABILITY

The content playback apparatus in the present invention can be utilized as a playback apparatus, for example, a BD recorder and a DVD recorder, which can easily cause a user to realize that what kind of content is prepared in accordance with each piece of restriction information even if any other piece of restriction information is added later.

REFERENCE SIGNS LIST

100 content playback apparatus
101 display content selection unit
102 removal password input unit
103 network transmission/reception unit
104 viewing restriction state management unit
105 display program execution unit
106 content display unit
107 display program generation unit
108 content information reception unit
109 setting information storage unit
110 display program storage unit
111 content storage unit
112 program template storage unit
150 digital television
160 remote control
170 mobile phone
300 setting information
400 content management information
510 authentication information
3401, 3507 age information storage unit

The invention claimed is:

1. A content playback apparatus that plays back a content to which restriction information for restricting playback has been attached, by removing the restriction through predetermined processing, the content playback apparatus comprising:
a content storage unit for storing a plurality of contents;
a setting information storage unit storing setting information, for each of one or more types of restriction information, including one or more rules about how to display an identifier of a content to which the restriction information has been attached;
a display unit operable to generate and display a content list with respect to each of the one or more types of restriction information in accordance with the setting information, the content list including identifiers of one or more contents to which corresponding restriction information has been attached;
a state information storage unit storing removal state information that shows, for each content, whether the restriction on playback has been removed or not;
a removal state update unit operable to, when the content playback apparatus performs the predetermined processing, regarding the content to which the restriction information has been attached, remove the restriction on playback by updating the removal state information so as to show that the restriction has been removed; and
a playback unit operable to, upon reception of selection input from a user, and when the removal state information of a content specified by the selection input shows that the restriction has been removed, play back the content.

2. The content playback apparatus of claim 1, wherein
the setting information includes, regarding the content to which the restriction information has been attached, time information about when the restriction is to be removed, and
the removal state update unit starts processing to remove the restriction put on the content in accordance with a timing shown by the time information.

3. The content playback apparatus of claim 1, wherein
the removal state update unit, when a first type of restriction information has been attached to a content, (i) collectively removes the restriction on playback put on all contents to which the first type of restriction information has been attached through the predetermined processing, and, when a second type of restriction information has been attached to a content, (ii) removes the restriction on playback put on each content to which the second type of restriction information has been attached through the predetermined processing one by one.

4. The content playback apparatus of claim 1, wherein
the setting information includes information about whether the identifiers of one or more contents are displayed or not, for each of the one or more types of the restriction information, and
the display unit does not display a content list being composed of one or more contents to which a first type of restriction information has been attached until the restriction is removed.

5. The content playback apparatus of claim 1, wherein
one or more content lists for the one or more types of restriction information include a content list being composed of one or more contents to which restriction information has not been attached, and
the display unit adds an identifier of a content whose restriction has been removed by the removal state update unit, to the content list being composed of the one or more contents to which restriction information has not been attached.

6. The content playback apparatus of claim 1, wherein
the setting information includes information, depending on a type of the restriction information, about when, after removing a restriction, a state where the restriction is removed is brought back to a state where the restriction is not removed, and the removal state update unit updates the removal state information from the state where the restriction is removed to the state where the restriction is not removed in accordance with the setting information.

7. The content playback apparatus of claim 1, further comprising
a content obtaining unit operable to obtain the content to which restriction information has been attached.

8. The content playback apparatus of claim 7, further comprising
a setting information obtaining unit operable to obtain setting information of a new type of restriction information which is not stored in the setting information.

9. The content playback apparatus of claim 1, further comprising
an output unit operable to output one or more content lists to an external apparatus upon reception of access from the external apparatus.

10. The content playback apparatus of claim 9, further comprising
a removal information storage unit storing an identifier unique to the external apparatus and removal information, which corresponds to the identifier, to remove a restriction on playback, wherein
upon reception of the access from the external apparatus, the removal state update unit obtains (i) the identifier unique to the external apparatus which is held by the external apparatus and (ii) the removal information held by the external apparatus, and removes the restriction on playback depending on whether a pair of the identifier and the removal information is stored in the removal information storage unit.

11. The content playback apparatus of claim 9, wherein
the restriction is a restriction based on an age of a user viewing a content,
the external apparatus holds first age information pertaining to an age of a user using the external apparatus, and outputs, along with the first age information, an instruction to remove the restriction put on the content to which the restriction information has been attached,
the content playback apparatus further comprising:
a second age information storage unit holding second age information pertaining to an age of a user using the content playback apparatus;
a judgment unit operable to judge, in response to the instruction output from the external apparatus, regarding the content to which restriction information has been attached, whether or not information requesting input of a security code to remove the restriction put on the content is displayed by using either one of the first age information or the second age information in accordance with a predetermined selection criterion, and
the predetermined processing is processing to, when the judgment unit judges affirmatively, display information requesting the input of the security code to remove the restriction put on the content, receive input of a valid security code from the user, and remove the restriction.

* * * * *